United States Patent [19]
Pulver et al.

[11] 3,933,254
[45] Jan. 20, 1976

[54] STACKER-UNSTACKER

[75] Inventors: Willis C. Pulver, Burbank; Henry A. Heide, Addison, both of Ill.

[73] Assignee: Velten & Pulver, Inc., Chicago Ridge, Ill.

[22] Filed: Mar. 8, 1973

[21] Appl. No.: 339,314

[52] U.S. Cl. .......... 214/6 DS; 214/6 TS; 214/8.5 A; 214/8.5 D; 271/193
[51] Int. Cl.² ...................................... B65G 60/00
[58] Field of Search ............ 214/6 DS, 8.5 D, 6 FS, 214/6 TS, 8.5 A; 198/41; 271/18.1, 193

[56] References Cited
UNITED STATES PATENTS

| | | | |
|---|---|---|---|
| 2,492,889 | 12/1949 | Royal | 198/41 X |
| 3,216,721 | 11/1965 | Ormondy | 271/193 X |
| 3,517,835 | 6/1970 | Temple | 214/8.5 D |
| 3,727,758 | 4/1973 | Cleland | 198/41 X |
| 3,770,143 | 11/1973 | Breitbach | 214/6 DS |
| 3,788,497 | 1/1974 | Carlson | 214/6 P |
| 3,831,780 | 8/1974 | Skarin et al. | 214/6 DS |

OTHER PUBLICATIONS
"Automatic Pan Control" The Baker's Digest, June 1972, p. 52.

*Primary Examiner*—Robert J. Spar
*Assistant Examiner*—Leslie J. Paperner
*Attorney, Agent, or Firm*—Prangley, Dithmar, Vogel, Sandler & Stotland

[57] ABSTRACT

A machine for feeding into a stack and removing from a stack baking pans and the like wherein there is provided a transfer conveyor, a pan carrier, a pan dropping mechanism for sequentially separating baking pans from the transfer conveyor and depositing the baking pans on the pan carrier, a pan lifting mechanism for sequentially lifting baking pans from the pan carrier and engaging the baking pans with the transfer conveyor. The carrier drive mechanism disclosed drives the pan carrier upwardly toward the transfer conveyor during unstacking and downwardly away from the transfer conveyor during stacking. A control mechanism is disclosed for selectively operating the transfer conveyor in a pan unstacking mode and in a pan pass-through mode and in a pan stacking mode.

A complete system for feeding baking pans and the like upon demand to a process station is shown including a process station, a baking pan handling station, sensing mechanism and control mechanism.

20 Claims, 21 Drawing Figures

STACKER-UNSTACKER

This invention relates to a system and the mechanism disclosed therein for feeding baking pans and the like upon demand to a process station and more particularly to a mechanism selectively operable in a pan unstacking mode and in a pan pass-through mode in a pan stacking mode.

It is an important object of the present invention to provide a machine for feeding into a stack and removing from a stack baking pans and the like, the machine comprising a transfer conveyor for conveying baking pans, a pan carrier mounted below the transfer conveyor in position to receive a pan dropped therefrom, a pan dropping mechanism for sequentially separating baking pans from the transferr conveyor and sequentially depositing the baking pans upon the pan carrier to form a stack of pans thereon, a pan lifting mechanism for sequentially lifting baking pans from the pan carrier and sequentially engaging the baking pans with the transfer conveyor, carrier drive mechanism for moving the pan carrier upwardly and toward the transfer conveyor as pans are unstacked from the pan carrier and onto the transfer conveyor and for moving the pan carrier downwardly and away from the transfer conveyor as baking pans are stacked on the pan carrier from the transfer conveyor, and a control mechanism for selectively and sequentially operating the transfer conveyor and the pan dropping mechanism and the pan lifting mechanism and the carrier drive mechanism in a baking pan unstacking mode and in a baking pan pass-through mode and in a baking pan stacking mode, the control mechanism in the baking pan unstacking mode thereof causing the pan lifting mechanism to operate sequentially to lift baking pans from the carrier and sequentially engage the baking pans and the transfer conveyor as the carrier drive mechanism sequentially moves the pan carrier upwardly and toward the transfer conveyor, the control mechanism in the pass-through mode thereof causing the transfer conveyor to carry the baking pans past the pan carrier, the control mechanism in the stacking mode thereof causing the pan dropping mechanism to operate sequentially to separate baking pans from the transfer conveyor and sequentially deposit the baking pans upon the carrier as the pan carrier drive mechanism sequentially moves the pan carrier downwardly and away from the transfer conveyor.

Another object of the present invention is to provide a machine of the type set forth wherein an infeed conveyor is provided for conveying baking pans to the transfer conveyor and an outfeed conveyor is provided for conveying baking pans away from the transfer conveyor.

Still another object of the present invention is to provide a machine of the type set forth wherein the transfer conveyor includes magnetic means for holding a baking pan for transport by the conveyor and the pan lifting mechanism is magnetic.

Yet another object of the present invention is to provide a machine of the type set forth which includes mechanism for breaking magnetic coupling between the conveyor and the baking pan to drop the baking pan onto the pan carrier to form a stack thereon and a shiftable magnet mounted adjacent to the conveyor and movable toward and away from the pan carrier and magnet drive mechanism for moving the shiftable magnet between a first position adjacent to the pan carrier and a second position adjacent to the conveyor, the shiftable magnet in the first position thereof magnetically coupling to a baking pan upon the pan carrier and in the second position thereof placing the baking pan on the conveyor in position for coupling to the magnetic means of the conveyor.

A further object of the present invention is to provide a machine of the type set froth including a stop member mounted adjacent to the conveyor and movable between a retracted position and a stop position and a stop member drive mechanism for moving the stop member between the retracted position wherein the stop member is out of the path of the baking pans on the conveyor and the stop position wherein the stop member stops baking pans in registry with the pan carrier.

A still further object of the present invention is to provide a machine for feeding into a stack and removing from a stack baking pans and the like including a magnetizable portion, the machine comprising a conveyor having a lower reach and including magnetic means for magnetically coupling to a baking pan to hold the baking pan beneath the lower reach of the conveyor for transport thereby, the magnetic means including two stationary portions spaced apart a distance at least equal to about the dimension of a baking pan in the direction of travel of the conveyor and a shiftable magnet disposed in the gap between the stationary portions, magnet drive mechanism for moving the shiftable magnet between a central position disposed adjacent to the lower reach and an up position disposed well above the lower reach and a down position disposed well below the lower reach, the shiftable magnet in the central position thereof cooperating with the stationary magnet portions to convey a baking pan upon the conveyor from one of the stationary portions across the shiftable magnet and on to the other stationary portions and in the up position thereof being spaced from a baking pan on the lower reach a distance such as to break the magnetic coupling therewith, a pan carrier mounted below the lower reach and in vertical registry with the shiftable magnet to receive a pan dropped from the conveyor, a stop member mounted adjacent to the conveyor and movable between a retracted position out of the path of a baking pan on the lower reach and a stop position in the path of a baking pan on the lower reach, stop member drive mechanism for moving the stop member between the retracted position and the stop position wherein the stop member stops baking pans in registry with the pan carrier, carrier drive mechanism for moving the pan carrier upwardly and toward the conveyor as pans are stacked on the pan carrier, and control mechanism for selectively operating the conveyor and the magnet drive mechanism and the stop member drive mechanism and the carrier drive mechanism in a baking pan unstacking mode in a baking pan pass-through mode and in a baking pan stacking mode, the control mechanism in the baking pan unstacking mode thereof causing the stop member drive mechanism to hold the stop member in the retracted position thereof and causing the magnet drive mechanism to shift the permanent magnet between the down position thereof and the central position thereof sequentially to engage baking pans on the pan carrier and to lift the baking pans from the pan carrier onto the conveyor and into conveying relationship therewith, the control mechanism in the pass-through mode thereof causing the stop member drive mechanism to hold the stop member in the retracted position thereof and causing the magnet drive mechanism to hold the shiftable magnet in the central position thereof so that the conveyor carries baking pans therealong and past the pan carrier, the control mechanism in the stacking mode thereof causing the stop member drive mechanism to move the stop member into the stop position thereof and sequentially to operate the magnet drive mechanism to shift the magnet from the central position thereof to the up position thereof when a baking pan strikes the stop member to drop the baking pan from the conveyor upon the pan carrier after which the pan carrier drive mechanism moves the pan carrier downwardly and away from the conveyor.

Yet another object of the present invention is to provide a machine for feeding into a stack baking pans and the like including a magnetizable portion, such machine comprising a conveyor including magnetic means for magnetically coupling to a baking pan to hold the baking pan on the conveyor for transport thereby, a pan carrier mounted below the conveyor in position to receive a pan dropped therefrom, a stop member mounted in the path of a baking pan on the conveyor to stop the baking pan in registry with the pan carrier, mechanism for breaking the magnetic coupling between the conveyor and the baking pan to drop the baking pan onto the pan carrier to form a stack thereon and carrier drive mechanism for moving the pan carrier downwardly and away from the conveyor as baking pans are stacked on the pan carrier from the conveyor.

A still further object of the present invention is to provide a machine for removing from a stack baking pans and the like, the machine comprising a transfer conveyor for conveying baking pans, a pan carrier mounted below the transfer conveyor in position to have a baking pan lifted therefrom, a pan lifting mechanism for sequentially lifting baking pans from the pan carrier and sequentially engaging the baking pans with the transfer conveyor, and carrier drive mechanism for moving the pan carrier upwardly toward the transfer conveyor as baking pans are lifted from the pan carrier to the conveyor.

Yet another object of the present invention is to provide a system for feeding baking pans and the like upon demand to a process station, the system comprising a baking pan handling station selectively operable in a pan unstacking mode and a pan pass-through mode and in a pan stacking mode, a first conveyor means for conveying baking pans from the outlet of the pan handling station to the process station, a second conveyor means for conveying baking pans to the inlet of the pan handling station, sensing mechanism adjacent to the process station for sensing a demand for baking pans thereat, and control mechanism responsive to sensing by the sensing mechanism for selectively and sequentially operating the pan handling station in the pan unstacking mode in the pan pass-through mode and in the pan stacking mode, the pan handling station in the pan unstacking mode thereof causing pans to be unstacked therefrom and conveyed by the first conveyor means to the process station, the pan handling station in the pan pass-through mode thereof causing pans to be passed thereby from the first conveyor means to the second conveyor means, the pan handling station in the pan stacking mode thereof causing pans conveyed thereto by the second conveyor means to be stacked thereat.

Still another object of the present invention is to provide a system of the type set forth in which the baking pan handling station is selectively operable in a pan unstacking mode and in a pan pass-through mode.

The invention both as to its organization and method of operation, together with further objects and advantages thereof, will best be understood by reference to the following specification taken in connection with the accompanying drawings in which.

Figure 1:
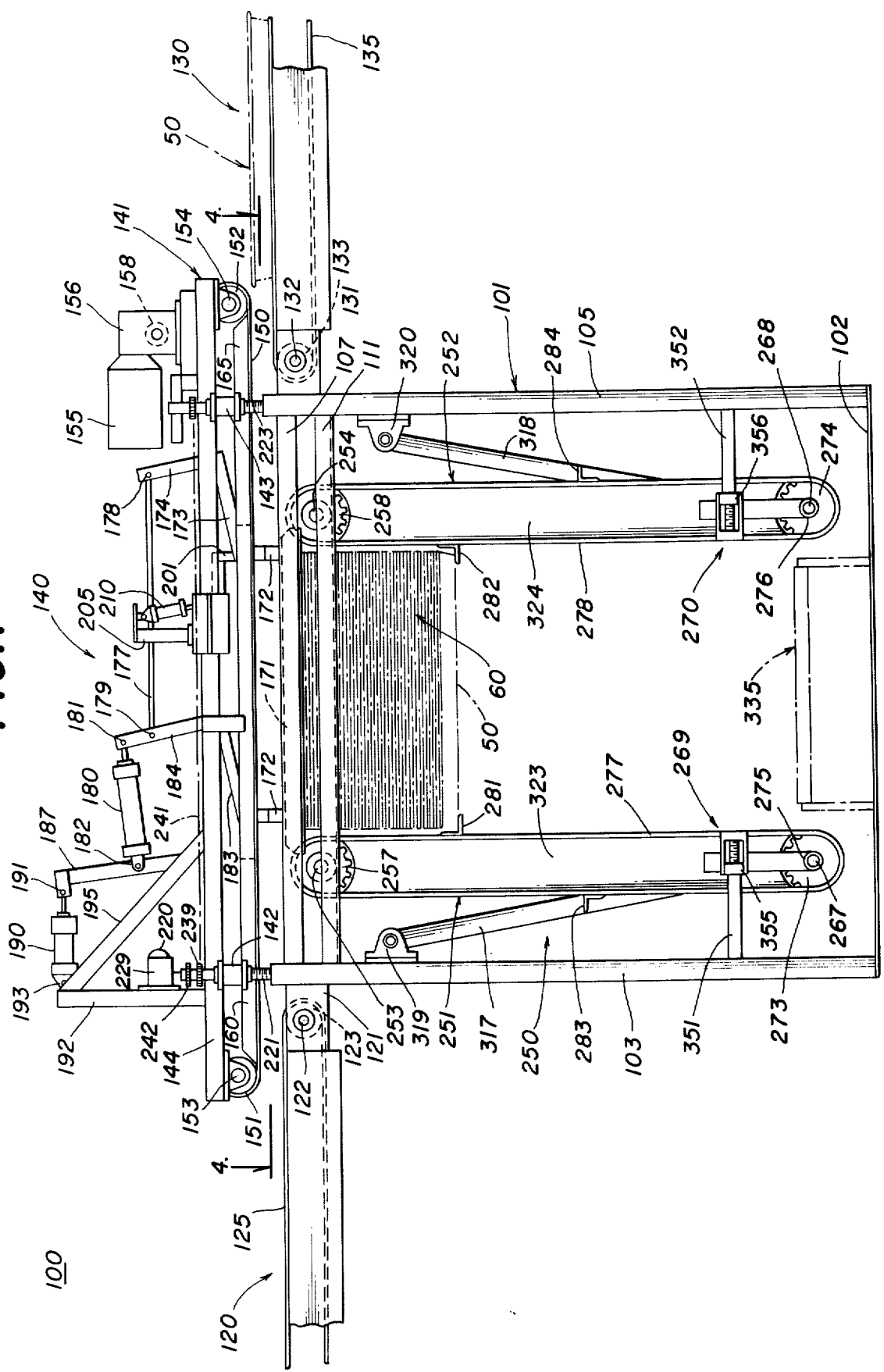
FIG. 1 is a side elevational view of the present invention with the infeed conveyor disposed on the left hand side of the figure and showing a stack of pans in position to be unstacked.

Referring now to FIGS. 1 to 3 and 8–10, there is disclosed a baking pan stacker-unstacker 100 for transporting baking pans 50 from an infeed conveyor 120 to an outfeed conveyor 130, the stacker-unstacker being selectively operable in a stacking mode thereof to stack the baking pans 50 into a stack 60 and in an unstacking mode thereof to unstack individual baking pans from the stack and in a pass-through mode thereof to pass the baking pans from the infeed conveyor to the outfeed conveyor. More particularly, the stacker-unstacker 100 includes a main frame 101 comprised of a base member 102 adapted to lie on a support surface such as the floor or the like. At the corners of the base member 102 there are provided four uprights 103, 104, 105 and 106 extending vertically upwards of the base. The uprights 103 and 105 are interconnected by a horizontally disposed top frame member 107, the uprights 103 and 104 are interconnected by a horizontally disposed top frame member 108; the uprights 104 and 106 are interconnected by a horizontally disposed top frame member 109; and the uprights 106 and 105 are connected by a horizontally disposed top frame member 110. There is further provided a cross frame member 111 interconnecting the upright 103 with the upright 105 and a cross frame member 112 interconnecting the upright 103 with the upright 104 and a cross frame member 113 interconnecting the upright 104 with the upright 106 and a cross frame member 114 interconnecting the upright 106 with the upright 105. Parallel to the cross frame member 112 but closer to the base 102 there is disposed a cross frame member 115 interconnecting the upright 103 with the upright 104 and parallel to the cross frame member 114 and in the same plane as the cross member 115 is a cross frame member 116 interconnecting the upright 105 with the upright 106.

The pan infeed conveyor 120 includes two parallel and spaced apart frame members 121 having two shafts 122 journaled for rotation therein, the shafts 122 being longitudinally spaced apart. Each of the shafts 122 has a sheave 123 thereon around which passes an endless belt 125, the infeed conveyor transporting pans 50 in the direction of the arrow 128.

The outfeed conveyor 130 includes two spaced apart frame members 131 supporting two longitudinally spaced apart shafts 132 journaled for rotation with respect thereto. Each of the shafts 132 has a sheave 133 positioned thereon supporting an endless belt 135, the outfeed conveyor transporting pans 50 in the direction shown by the arrow 138.

There is further provided a transfer conveyor 140 having a frame 141 which includes two longitudinally spaced apart and parallel end members 142 and 143 interconnected by two longitudinally extending and horizontally spaced apart longitudinal members 144 and 145, the longitudinal members 144 and 145 resting upon and fixedly secured to the end members 142 and 143. Each of the frame members hereinbefore described is preferably hollow and square in transverse cross section.

The transfer conveyor 140 includes a motor mounting plate 146 fixedly secured to the longitudinal member 145 and a cross member 147 interconnecting the members 144 and 145 adjacent to the outfeed conveyor 130. As seen particularly in FIG. 2, there is disposed a sprocket 149 between the motor mounting plate 146 and the outfeed conveyor 130.

Two spaced apart endless belts 150 are supported by two spaced apart horizontally spaced apart pulleys 151 adjacent to the infeed conveyor 120 and two horizontally spaced apart pulleys 152 adjacent to the outfeed conveyor 130, the pulleys 151 and 152 being aligned so as to provide two spaced apart endless belts 150 in alignment with the infeed conveyor 120 and the outfeed conveyor 130. Each of the pulleys 151 is mounted on a shaft 153 and each of the pulleys 152 is mounted on a shaft 154, the shafts 153 and 154 being suitably journaled for rotation with respect to the frame 141. A drive motor 155 is connected to a gear reducer 156 which is supported by the motor mounting plate 146, the gear reducer having an output shaft 157 extending therefrom. A sprocket 158 is fixedly mounted on the shaft 157 and is interconnected to the sprocket 149 which is mounted on the shaft 154 by means of a chain 159, thereby interconnecting the motor 155 with the endless belts 150.

Figure 9:
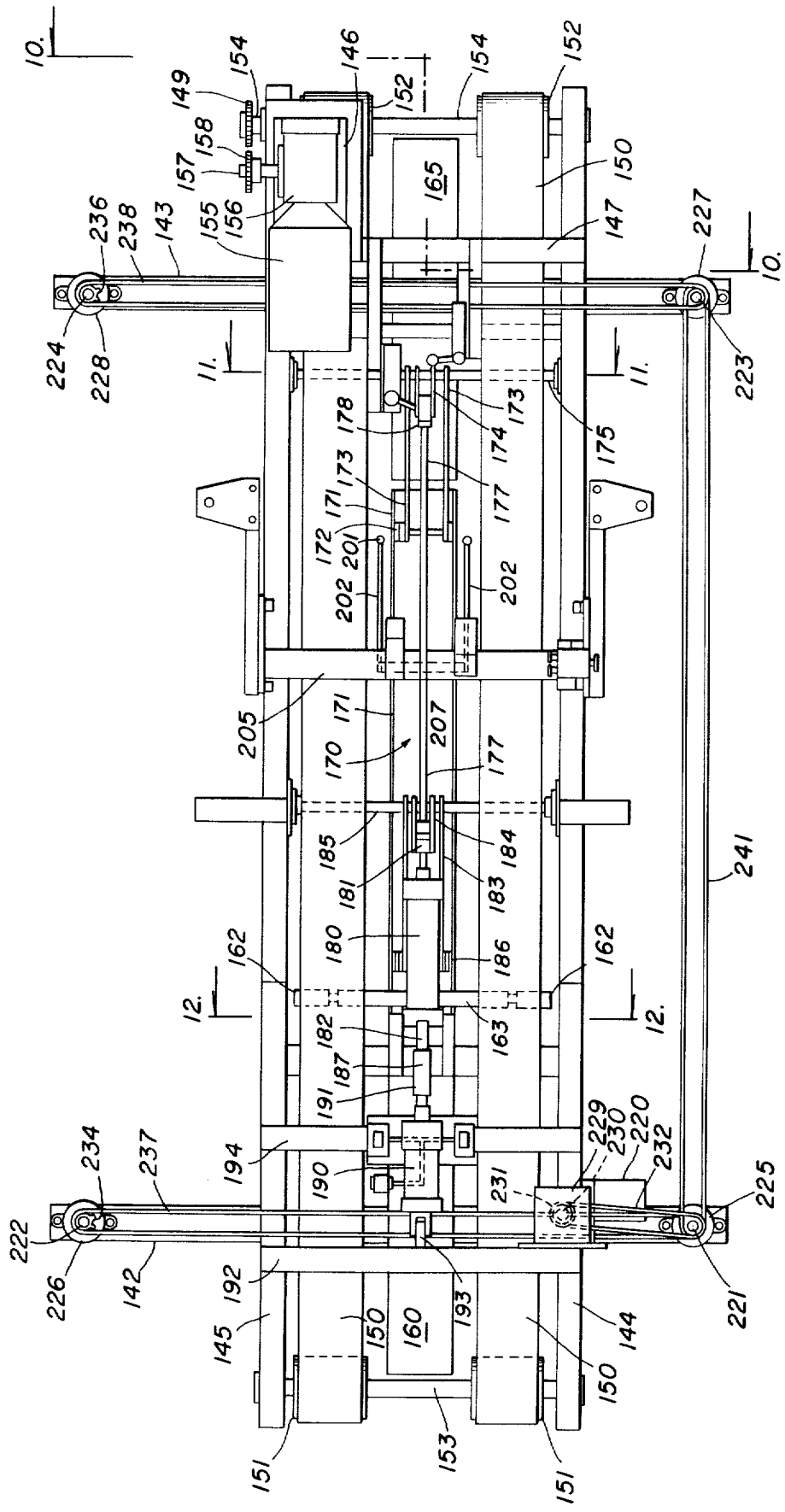
FIG. 9 is a top plan view of the machine shown in FIG. 8.
Figure 10:
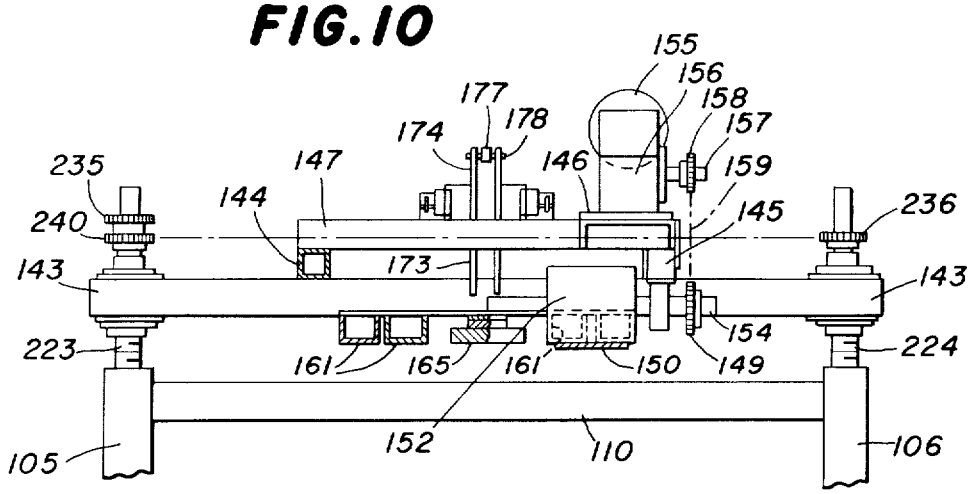
FIG. 10 is an elevational view partly in section of the machine shown in FIG. 9 as viewed along lines 10—10 thereof.
Figure 11:
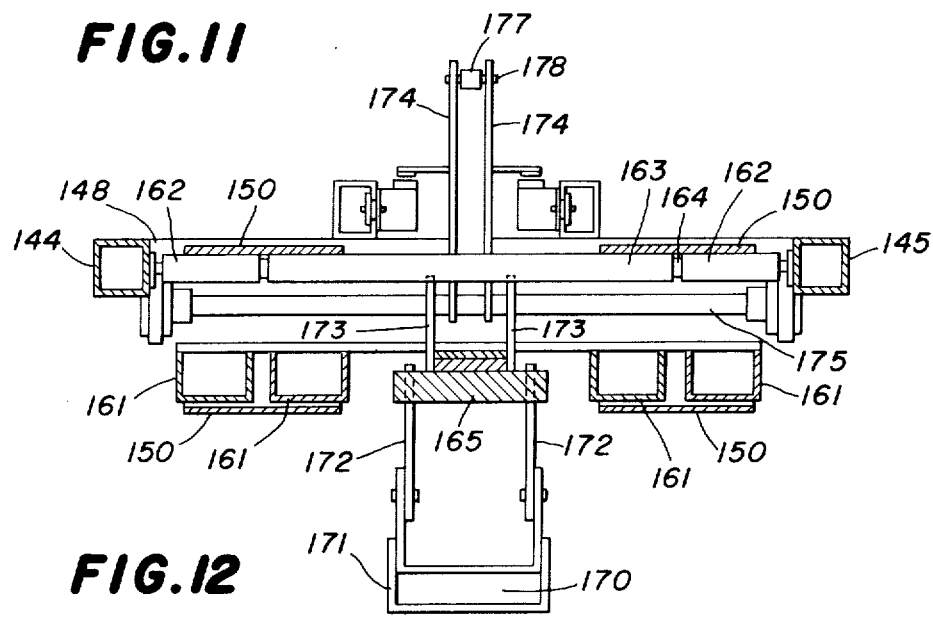
FIG. 11 is a view in vertical section of the machine shown in FIG. 9 as viewed along lines 11—11 thereof.

Referring now to FIGS. 9–11, a permanent magnet 160 is mounted intermediate the endless belts 150 and extends from near the pulleys 151 toward the center of the transfer conveyor 140, also see FIG. 1, the magnet 160 being positioned between four spaced apart guide channels 161 which also serve to guide the endless belts 150. Two spaced apart return rollers 162 are positioned on either side of the central return roller 163 all of which are positioned on a shaft 164 mounted on the frame members 144 and 145, the return rollers supporting the endless belts 150 in the upper reach of their path. A second fixed magnet 165 is positioned intermediate the two endless belts 150 near the pulleys 152 and also extends toward the center of the transfer conveyor 140. Both the magnets 160 and 165 are fixedly connected to the frame 141 and extend respectively from the infeed end and the outfeed end toward the center of the transfer conveyor 140 and terminate so as to leave a central opening therebetween.

A shiftable magnet 170 is positioned in a magnet housing 171, which as may be seen in FIGS. 1–2 and 8 through 11, is mounted on four arms 172, two of the arms 172 being positioned near each end of the magnet housing 171 and extending upwardly therefrom. Connected to the two arms 172 near the end of the magnet 170 adjacent to the magnet 165 are two crank arms 173 which in turn are connected to two crank arms 174, the crank arms 174 and 173 being pivotally connected as at 175 and the arms 173 and 172 being pivotally connected as at 176. A tie rod 177 is pivotally connected to the two parallel crank arms 174 by a pivot shaft 178 and is also pivotally connected to a shaft 179 at the other end of the tie rod.

A motor 180 for the shiftable magnet 170 is provided in the form of an air cylinder having a piston 180a, the motor being pivotally connected to the mechanism hereinafter described at points 181 and 182. Two spaced apart crank arms 183 are each connected to a respective one of the arms 172 at the end of the magnet housing 171 near the magnet 160. The crank arms 183 are each connected to a respective one of two crank arms 184, the crank arms 184 being connected to the crank arms 183 by two pivots 185 and the crank arms 183 being connected to the arms 172 by two pivots 186. The cranks arms 184 are interconnected by the pivot shaft 179 thereby pivotally to connect the crank arms 184 to the tie rod 177. The crank arms 184 are also pivotally connected to the motor 180 and more particularly to the piston 180a thereof as at 181. A lever 187 is pivotally mounted to the frame 141 by a pivot 188, the lever 187 also being pivotally mounted to the motor 180 by the pivot 182.

A stacking-unstacking motor 190 is provided in the form of an air cylinder having a piston 190a extending therefrom, which piston is pivotally connected by a pivot 191 to the lever 187. The motor 190 is also pivotally connected to a support 192 by a pivot shaft 193, the support 192 being in the form of spaced apart upwardly extending members interconnected by a cross member 194, which cross member 194 is connected to the support 192 by means of a slant support 195.

A pan stop mechanism 200 is provided wherein two spaced apart stop members 201 are fixedly connected to an arm 202, which arm 202 is pivoted as at 203 to a link 204 which in turn is pivotally mounted on a shaft 207. The shaft 207 is supported by a subframe 205 having a block 206 extending downwardly therefrom. A pan stop motor 210 is pivotally mounted on the subframe 205 by a pivot 211, the motor 210 having a shaft 210a pivotally connected to the arm 202 as at 212.

Referring now to FIGS. 1–2 and 8 through 10, there is shown a motor 220 for adjusting the height of the frame 141. There are also provided four screw shafts, one in each of the uprights of the frame 101, the screw shaft 221 extending upwardly from the upright 103, the shaft 222 extending upwardly from the upright 104, the shaft 223 extending upwardly from the upright 105 and the shaft 224 extending upwardly from the upright 106. Each of the screw shafts is provided with a flange bearing, the shaft 221 being provided with the flange bearing 225, the shaft 222 being provided with the flange bearing 226, the shaft 223 being provided with the flange bearing 227 and the shaft 224 being provided with the flange bearing 228. It is seen, therefore, that the end members 142 and 143 of the frame 141 are connected to the flange bearings 225 through 228 and are movable therewith along the respective ones of the threaded shafts 221 to 224 thereby to raise and lower the transfer conveyor 140 with respect to the frame 101.

A gear reducer 229 is connected to the motor 220 and has an output shaft 230 extending therefrom. A sprocket 231 is fixedly mounted on the output shaft 230 of the gear reducer 229 and is connected by means of a chain 232 to a sprocket 233 fixedly mounted on the shaft 221. A sprocket 234 is fixedly mounted on the shaft 222 and a sprocket 235 is fixedly mounted on the shaft 223 and a sprocket 236 is fixedly mounted on the shaft 224. A chain 237 interconnects the sprocket 234 on the shaft 222 with the sprocket 233 on the shaft 221 and a chain 238 interconnects the sprocket 236 on the shaft 224 with the sprocket 235 on the shaft 223. A sprocket 239 is fixedly mounted to the shaft 221 and a sprocket 240 is fixedly mounted on the shaft 223, the sprockets 239 and 240 being interconnected by a chain 241. It is seen, therefore, that the motor 220 is connected by means of the output shaft 230 and the chain 232 to each of the threaded shafts 221, 222, 223, and 224, the interconnection being by means of the hereinbefore mentioned sprockets and chains. Activation of the motor 220 resulting in rotation of the shaft 230 thereby causes the threaded shafts 221 to 224 to rotate thereby to raise or lower the frame 141 and thereby the transfer conveyor 140 with respect to the frame 101 in order to accommodate bread pans of various sizes, as hereinafter will be explained.

Referring now to FIGS. 1–7, there is disclosed an elevator 250 having an input size 251 and an output side 252. An upper shaft 253 near the input side 251 is spaced from and lies in the same plane as an upper shaft 254, the upper shaft 253 being journaled for rotation in bearings 255 and the upper shaft 254 being journaled for rotation in bearings 256. The two bearings 255 and the two bearings 256 are maintained between the top frame members 107 and 109 and the cross frame members 111 and 113 respectively. The shaft 255 has two spaced apart sprockets 257 fixedly mounted thereto for rotation therewith and the shaft 254 also has two spaced apart sprockets 258 fixedly mounted thereon for rotation therewith, the sprockets 257 and 258 being in registry. The shaft 253 has an upper sprocket assembly 259 mounted thereon and opposite to an upper sprocket shaft assembly 260 mounted on the shaft 254. Similarly, on the other side of the sprockets 257 and upper sprocket shaft assembly 261 is mounted on the shaft 253 and opposite thereto on the shaft 254 is an upper sprocket shaft assembly 262. The upper sprocket shaft assembly 259 is fixedly mounted to a support block 263 which is mounted about the shaft 253 so as to remain fixed during rotation of the shaft. Similarly, a support block 264 is associated with the upper shaft assembly 260, a support block 265 is associated with the upper shaft assembly 261 and a support block 266 is associated with the upper shaft assembly 262.

Vertically positioned below the shaft 253 is a lower shaft 267 and vertically positioned below the shaft 254 is a lower shaft 268, the lower shaft 267 being maintained in position by two lower sprocket shaft assemblies 269 and 271 and the lower shaft 268 being maintained in position by two lower sprocket shaft assemblies 270 (one shaft assembly not being shown). Two spaced apart sprockets 273 are fixedly mounted on the shaft 267 in registry with the sprockets 257 on the shaft 253 and two spaced apart sprockets 274 are mounted on the shaft 268 in registry with the sprockets 258 on the shaft 254. The shaft 267 is provided with bearings 275 in the lower sprocket shaft assemblies 269 and 271 to facilitate rotation of the shaft 267 with respect thereto. Similarly, the shaft 268 is provided with two bearings 276 to facilitate rotation of the shaft with respect to the lower sprocket shaft assemblies 270 and the sprocket assembly not shown. There is further provided to chains 277 interconnecting the sprockets 273 on the shaft 267 with the sprockets 257 on the shaft 253. Also, there are two chains 278 interconnecting the sprockets 274 on the shaft 268 with the sprockets 258 on the shaft 254, the chains 277 and 278 providing four endless belts connecting the four shafts.

Fixedly connected to the drive chains 277 is a pan carrier 281 including an outwardly disposed flange providing a support surface for the bottom of a bread pan 50. The pan carrier 281 extends between the drive chains 277 and is situated to present a horizontal surface during movement of the chains. Similarly, there is provided a pan carrier 282 interconnecting the drive chains 278 and providing a horizontal surface for supporting the bottom of a bread pan 50, the horizontal surfaces provided by the pan carriers 281 and 282 lying in the same plane. There are also provided two pan carriers 283 and 284 mounted respectively between the drive chains 277 and the drive chains 278. The pan carriers 283 and 284 are mounted in such a fashion that when they are facing one another they also will provide horizontal support surfaces lying in a single horizontal plane for the bread pans 50.

A pan carrier drive motor 290 has an output shaft 291 extending therefrom to which a pulley 292 is fixedly connected. A chain 294 interconnects the pulley 292 with a pulley 293 which in turn is connected to a clutch brake assembly 295 having a shaft 296 extending vertically downwardly therefrom. A pulley 297 is fixedly mounted on the shaft 296 which pulley, shaft and clutch brake assembly 295 are all mounted adjacent to the upright 106. Adjacent to the upright 104 there is mounted a pulley 298 on a downwardly extending shaft 300, the pulley 298 being interconnected with the pulley 297 by a gear belt 299. It is seen, therefore, that activation of the motor 290 results in rotation of the output shaft 291 thereof, of the shaft 296 and the shaft 300.

Figure 2:
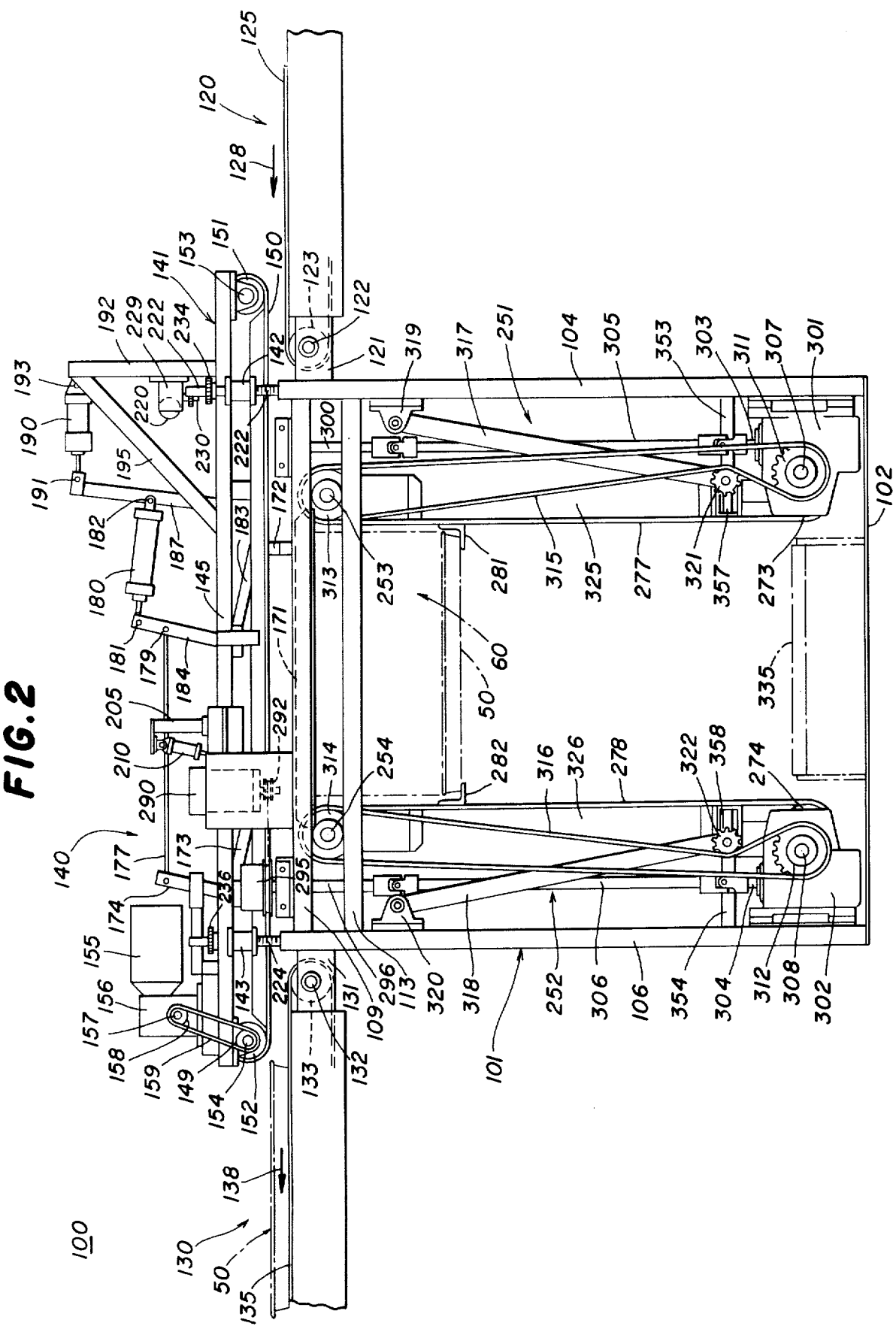
FIG. 2 is a side elevational view of the machine disclosed in FIG. 1 having the infeed conveyor on the right side of the drawing.
Figure 3:
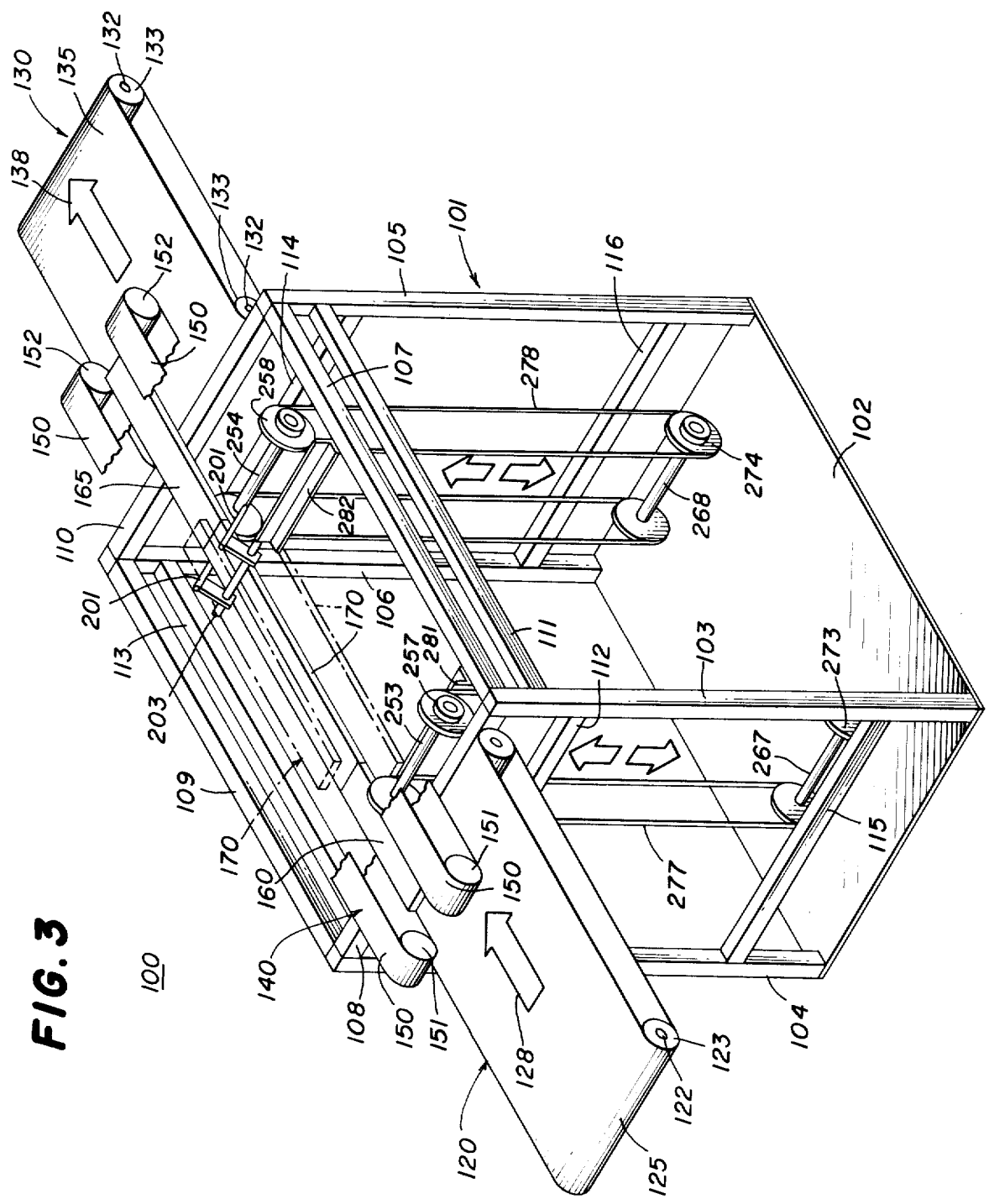
FIG. 3 is a perspective view of the machine shown in FIG. 1, particularly illustrating the frame elements of the machine and particularly showing the movement of the pan elevator.
Figure 4:
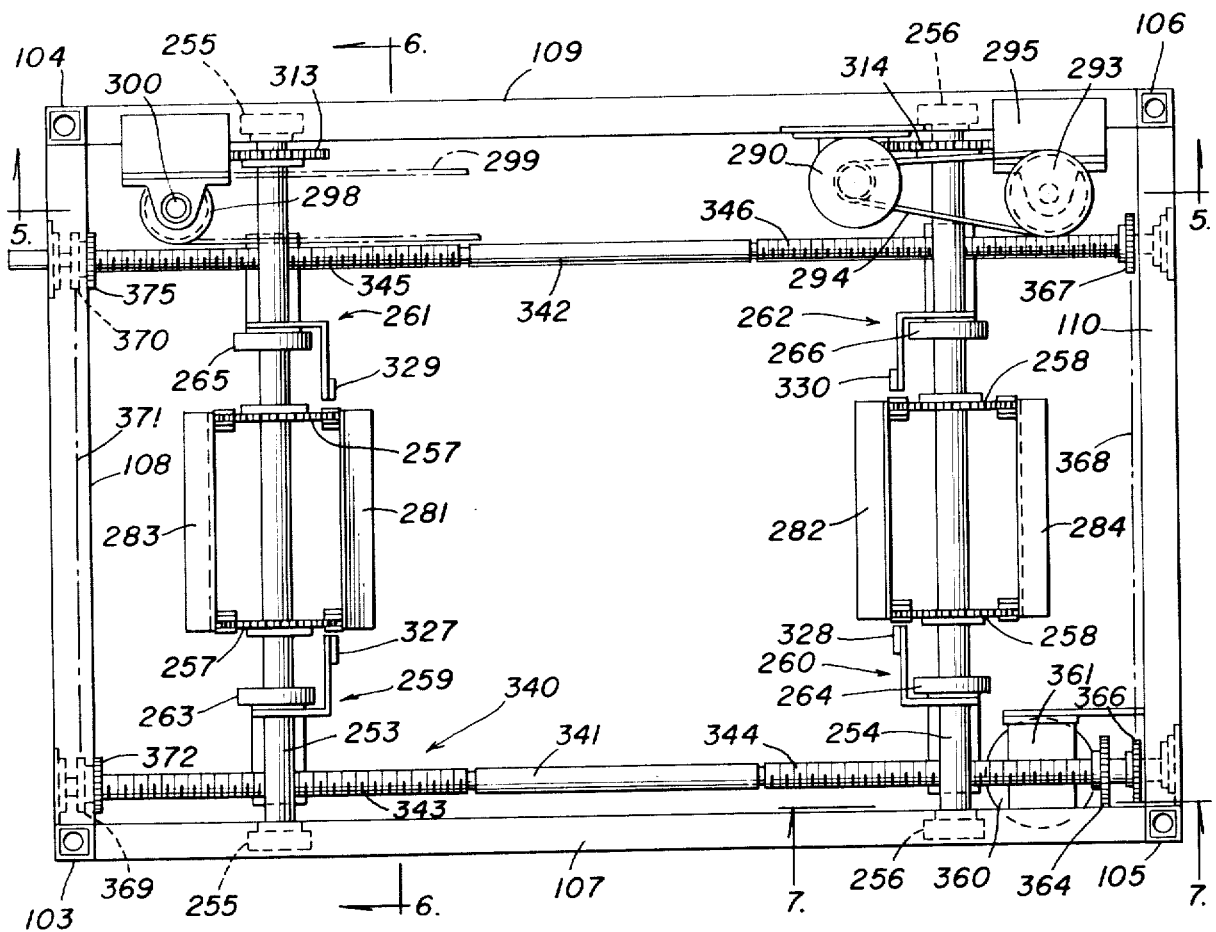
FIG. 4 is a view in horizontal section of the machine shown in FIG. 1 as viewed along lines 4—4 thereof.
Figure 5:
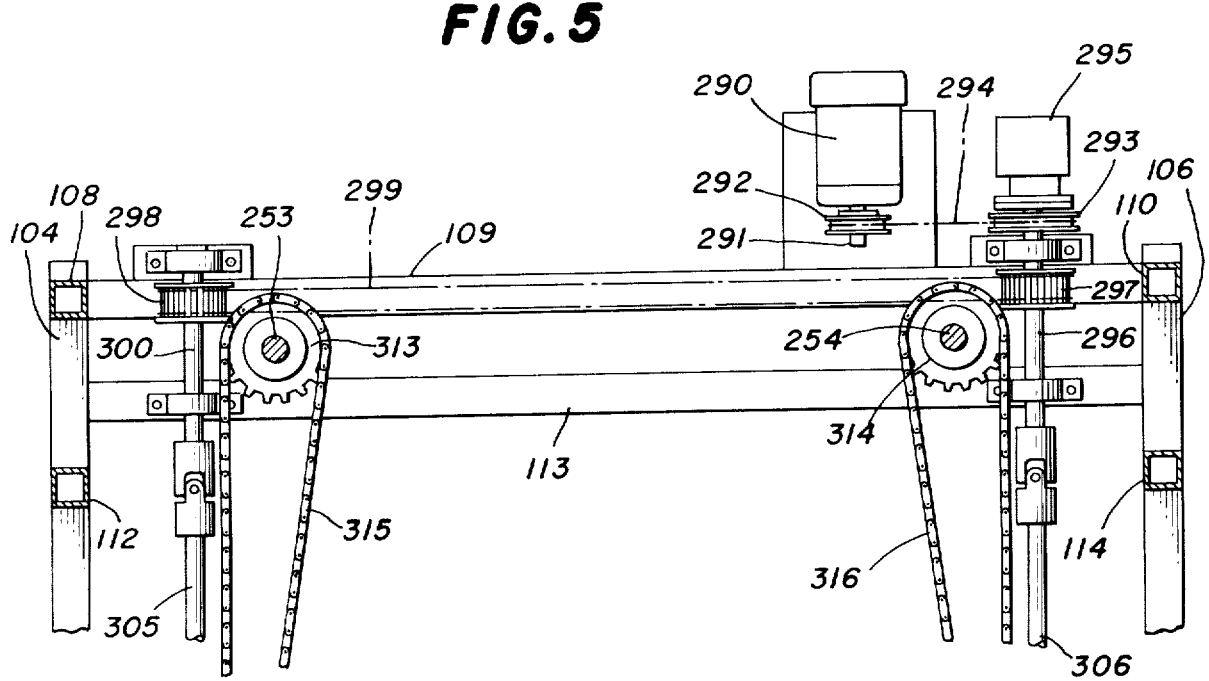
FIG. 5 is a longitudinal sectional view partly in section of the machine shown in FIG. 4 taken along lines 5—5 thereof.
Figure 6:
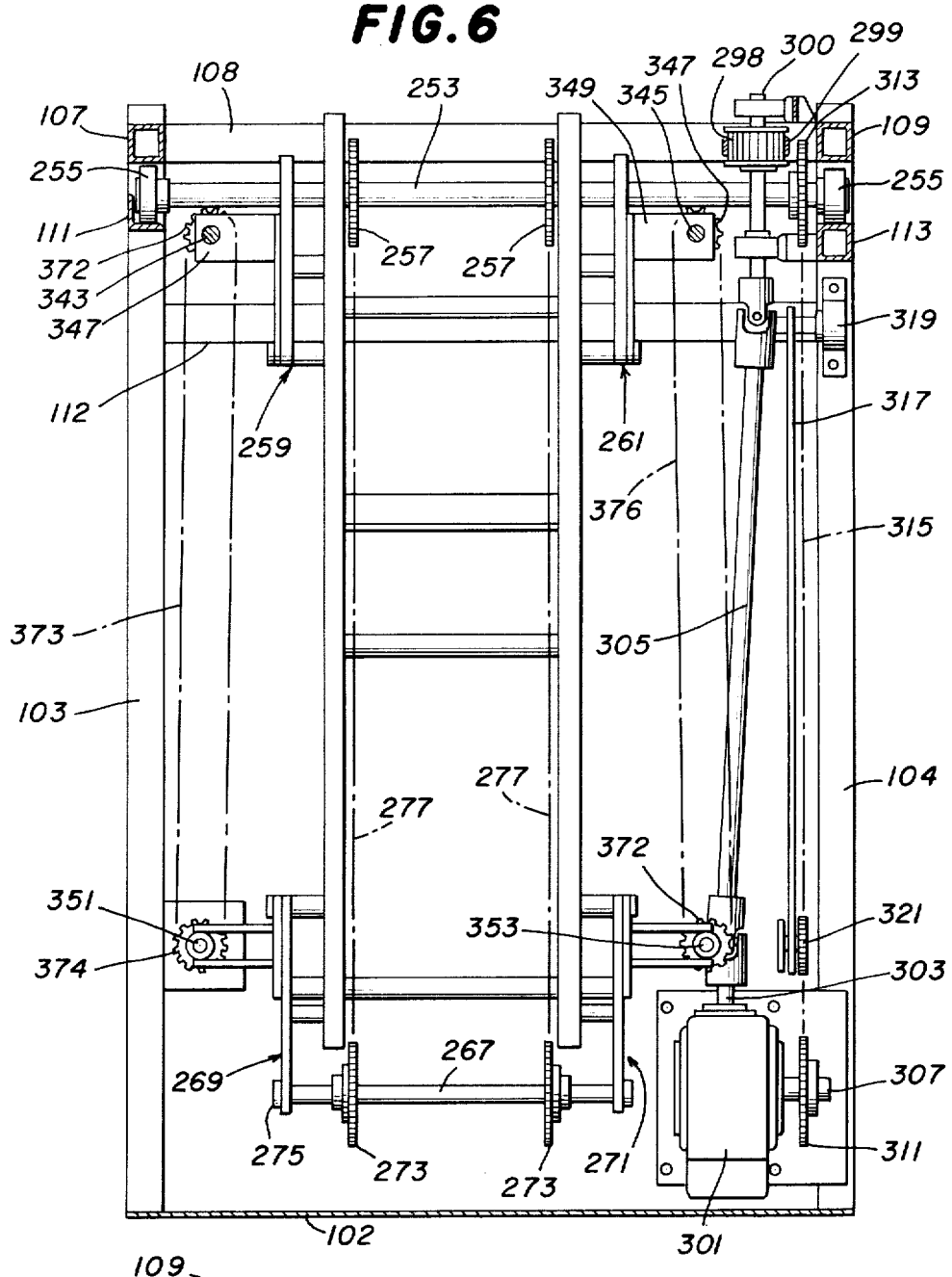
FIG. 6 is a view in vertical section partly in section of the machine shown in FIG. 4 as viewed along lines 6—6 thereof.
Figure 7:
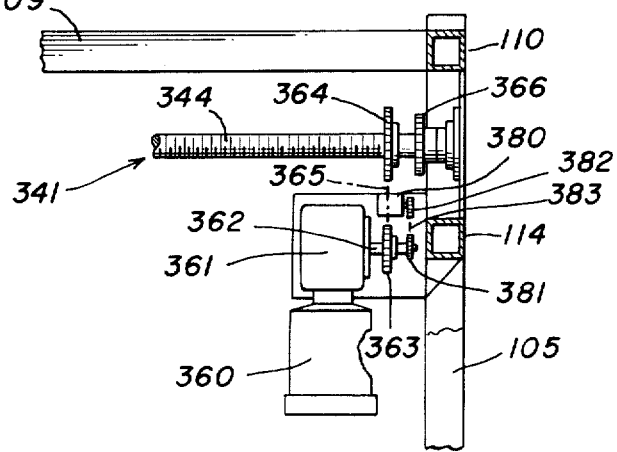
FIG. 7 is a longitudinal sectional view paratly in section of the machine shown in FIG. 4 as viewed along lines 7—7 thereof.
Figure 8:
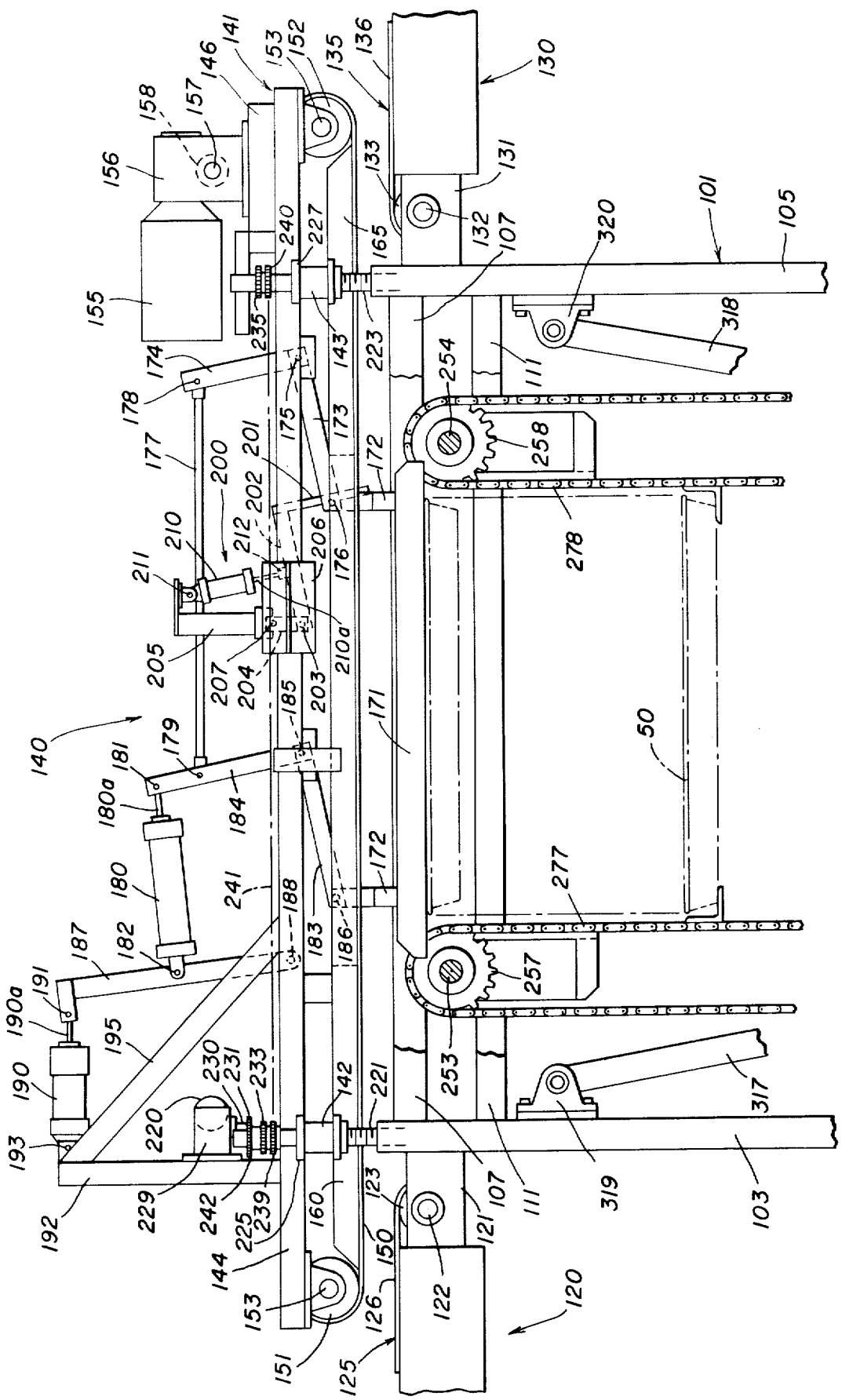
FIG. 8 is an enlarged side elevational view of the machine shown in FIG. 1 particularly illustrating the transfer conveyor portion thereof.

As seen particularly in FIGS. 2 and 6, a gear reducer 301 is positioned adjacent to the base 102 near the upright 104 and another gear reducer 302 is similarly placed near the upright 106. The gear reducer 301 is provided with an input shaft 303 and the gear reducer 302 is provided with an input shaft 304, the input shaft 303 being connected by a suitable universal joint to a drive shaft 305 which is connected by another universal joint to the shaft 300. Similarly, the input shaft 304 of the gear reducer 302 is connected to a drive shaft 306 which in turn is connected to the shaft 296. The gear reducers 301 and 302 are respectively provided with output shafts 307 and 308 each of which extend perpendicularly with respect to the input shafts 303 and 304. A sprocket 311 is fixedly mounted on the output shaft 307 of the gear reducer 301 and a sprocket 312 is fixedly mounted on the output shaft 308 of the gear reducer 302. A sprocket 313 is fixedly mounted on the shaft 253 vertically above the sprocket 311 and a sprocket 314 is mounted on the shaft 254 vertically above the sprocket 312. A chain 315 interconnects the sprocket 311 with the sprocket 313 and a chain 316 interconnects the sprocket 312 with the sprockets 314 thereby to interconnect the gear reducers 301 and 302 with the respective ones of the shafts 253 an 254.

A take-up arm 317 is pivotally mounted to the frame 101 as at 319 while a take-up arm on 318 is pivotally mounted to the frame at 320. The take-up arm 317 has an outer sprocket 321 on the end thereof away from the pivot 319, which outer sprocket is adapted to engage the chain 315. An outer sprocket 322 is mounted on the end of the take-up arm 318 away from the pivot 320, which sprocket is adapted to ride in the chain 316. Chain guards 323 and 325 are mounted to insure that the chains 277 remain engaged with the sprockets 257 and 273 while chain guards 324 and 326 are mounted to insure that the chains 278 remain engaged with the sprockets 258 and 274. Each of the upper sprocket shaft assemblies 259, 260, 261 and 262 is provided with a respective one of the chain guides 327, 328, 329 and 330 thereby to maintain the bread pans 50 in position on the pan carriers 281 and 282 during movement of the stack 60 toward and away from the transfer conveyor 140. Finally, there is provided a conveyor 335 shown in phantom in FIGS. 1 and 2 for removing stacked baking pans from the machine 100 or for bringing stacked baking pans into the machine 100 all as hereinafter to be set forth.

A pan carrier length adjustment mechanism 340 includes an upper screw shaft 341 positioned intermediate the top frame member 107 and the upper sprocket shaft assemblies 259 and 260 and an upper screw shaft 342 positioned intermediate the top frame member 109 and the upper sprocket shaft assemblies 261 and 262. The upper screw shaft 341 has spaced apart threaded sections 343 and 344 and the upper screw shaft 342 has spaced apart threaded sections 345 aand 356. The upper screw shaft 341 extends through a support block 347 on the upper sprocket shaft assembly 259 and another support block (not shown) on the upper sprocket shaft assembly 260. The shaft 341 is journaled for rotation in bearings positioned on support blocks between the top frame member 108 and the cross frame member 112 and the top frame member 110 and the cross frame member 114. Similarly, the shaft 342 is also supported in support block 349 associated with the shaft assembly 261 and another support block (not shown) associated with the shaft assembly 262. The shaft 342 is journaled for rotation within bearings maintained between the above-referred to top frame members and cross frame members. As seen particularly in FIGS. 1, 2 and 6, there are provided spaced apart lower screw shafts 351 and 352 vertically disposed below the upper screw shaft 341 and the lower screw shafts 353 and 354 vertically disposed below the upper screw shaft 342. The lower screw shafts 351 and 354 are respectively maintained in blocks 355 to 358 thereby to mount the shafts as hereinbefore set forth.

As seen particularly in FIGS. 4–7, a pan carrier length adjustment motor 360 is connected to a gear reducer 361 having an output shaft 362 extending therefrom. The output shaft 362 has fixedly mounted thereon a sprocket 363 which is connected by a chain 365 to a sprocket 364 vertically disposed thereabove and fixedly connected to the screw shaft 344. A drive sprocket 366 is fixedly mounted on the shaft 341 and is connected to a drive sprocket 367 fixedly mounted on the shaft 342 by a chain 368 extending therebetween. Another drive sprocket 369 is mounted on the end of the shaft 341 opposite to sprocket 366 and the sprocket 369 is interconnected with a drive sprocket 370 fixedly mounted on the shaft 342 by a chain 371 extending therebetween. A sprocket 372 is mounted on the threaded portion 343 of the shaft 341 and is interconnected to a sprocket 374 fixedly mounted on the lower screw shaft 351 by a chain 373, the sprockets 372 and 374 being in vertical alignment. Similarly, a sprocket 375 is fixedly mounted on the threaded portion 345 of the shaft 342 and is connected to a sprocket 377 mounted on the lower screw 353 by a chain 376, the sprockets 375 and 377 being in vertical alignment. Finally, there is provided a counter 380 connected to a sprocket 381 mounted on the output shaft 362 of the motor 360 by a sprocket 382 fixedly mounted to the output shaft of the counter 380 and interconnected to the sprocket 381 by a chain 383.

Following is an explanation of the mechanical operation of the system hereinbefore described. Both the infeed conveyor 120 and the outfeed conveyor 130 have independent drive mechanisms not shown which provide for movement of the endless belts 125 and 135 respectively in the direction of the arrows 128 and 138 respectively. The transfer conveyor 140 and more particularly the two spaced apart conveyor belts 150 continuously move so that the lower reaches of the conveyor belts move from the infeed conveyor 120 to the outfeed conveyor 130. This movement of the conveyor belts 150 is provided by the drive motor 155 operatively connected by means of the sprockets 149 and 158 and the chain 159 to the drive shaft 154, thereby to provide movement of the endless belts 150. It is noted that the pulleys 151 and 152 around which the endless belts 150 pass overlap the upper reaches of both the infeed conveyor 120 and the outfeed conveyor 130 thereby to provide for continuous movement therebetween.

As a pan 50 moves along the upper reach of the infeed conveyor 120 it eventually contacts the lower reach of the endless belts 150 and is held there against by the permanent magnet 160, it being noted that the bottom surface of the permanent magnet 160 lies in a plane with the endless belts 150. The functional engagement between the belts 150 and the pan 50 provides for movement of the pan by the belts from the infeed conveyor 120 to the outfeed conveyor 130, permanent magnet 160, the shiftable magnet 170 and the permanent magnet 165 insuring continuous contact between the pan 50 and the endless belts.

Figure 13:
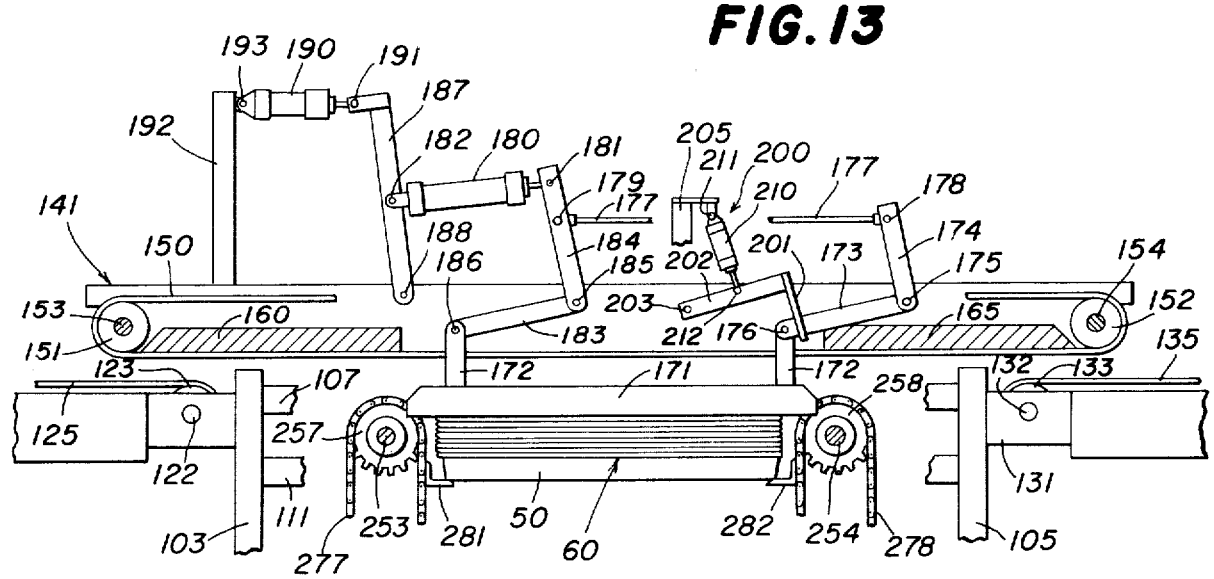
FIG. 13 is a schematic view of the transfer mechanism and elevator of the present invention in the pan unstacking mode thereof.
Figure 14:
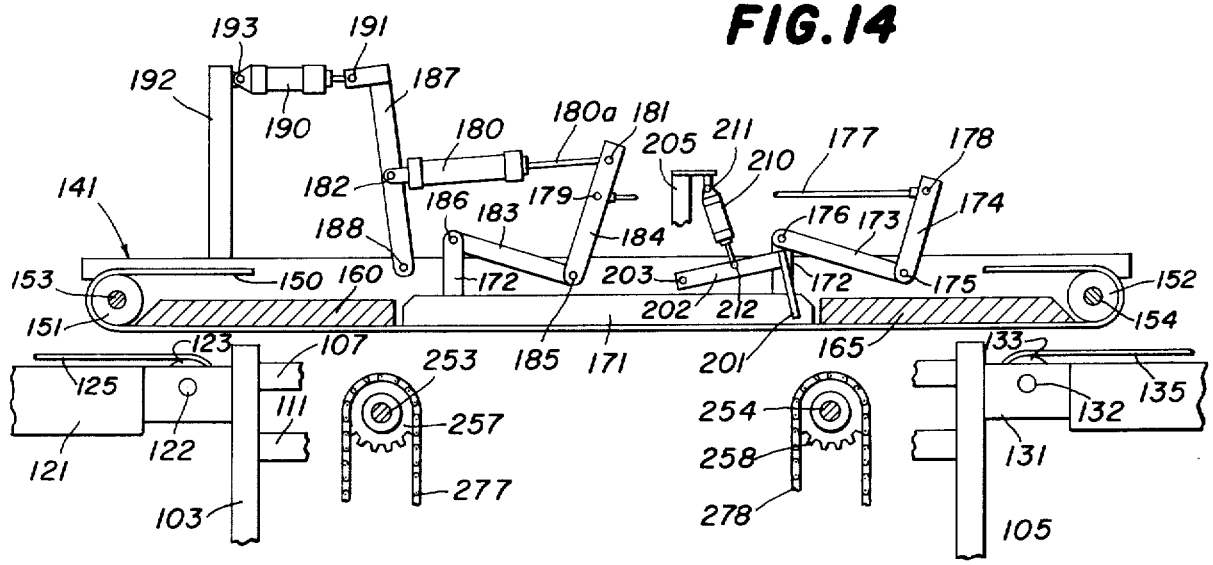
FIG. 14 is a schematic view of the transfer mechanism and elevator of the present invention in the pan pass-through mode thereof.

The shiftable magnet 170 is movable between three positions depending upon the mode of operation of transfer conveyor 140 and more particularly the mode of operation of the stacker-unstacker 100. The stacker-unstacker 100 is constructed and arranged to operate in an unstacking mode wherein pans 50 are unstacked from a stack 60 of pans carried by the pan carrier, more particularly the elevator 250, and to operate in a pass-through mode wherein pans 50 are moved from the infeed conveyor 120 by the transfer conveyor 140 to the outfed conveyor 130 and in a stacking mode wherein pans are moved from the infeed conveyor 120 to a position in registry with the pan carrier, movement of the pan being halted by the pan stop 200, and thereafter released so as to form a stack 60 of pans. In the unstacking mode, the stacker 100 is in the position as shown in FIG. 13 of the drawings wherein the pan stop 200 is in a retracted position thereof so that the stop members 201 are out of the path of the baking pans 50, the motor 210 having a piston 210A thereof retracted. The shiftable magnet 170 is in its lowest position wherein the magnet extends below the lower reach of the endless belts 150 and the pan magnetically contacts the topmost pan 50 in the stack 60, the motor 180 being in the retracted position thereof and the motor 190 being in the retracted position thereof thereby to position shiftable magnet 170 through the linkage hereinbefore described in the position described in FIG. 13. Once the shiftable magnet 170 is in magnetic contact with the pan 50 the motor 180 is actuated so that the piston 180A is extended thereby to move the shiftable magnet to the center position as shown in FIG. 14, wherein the bottom surface of the shiftable magnet lies in the same plane as the bottom surfaces of the permanent magnets 160 and 165. In the central position shown in FIG. 14, the endless belts 150 are in position to convey the pan 50 previously removed from the stack 60 to the outfeed conveyor 130, all as hereinbefore described.

The stacker-unstacker 100 operates in a pass-through mode when it is in the condition shown in FIG. 14 wherein the bottom surfaces of the permanent magnets 160 and 165 lie in the same plane as the bottom surface of the shiftable magnet 170, thereby to insure magnetic coupling of a pan 50 onto the transfer conveyor 140 and more particularly onto the lower reaches of the endless belts 150. In the mode shown in FIG. 14, pans 50 are conveyed to the outfeed conveyor 130 whether the pan came from the stack 60 or from the infeed conveyor 120.

Figure 15:
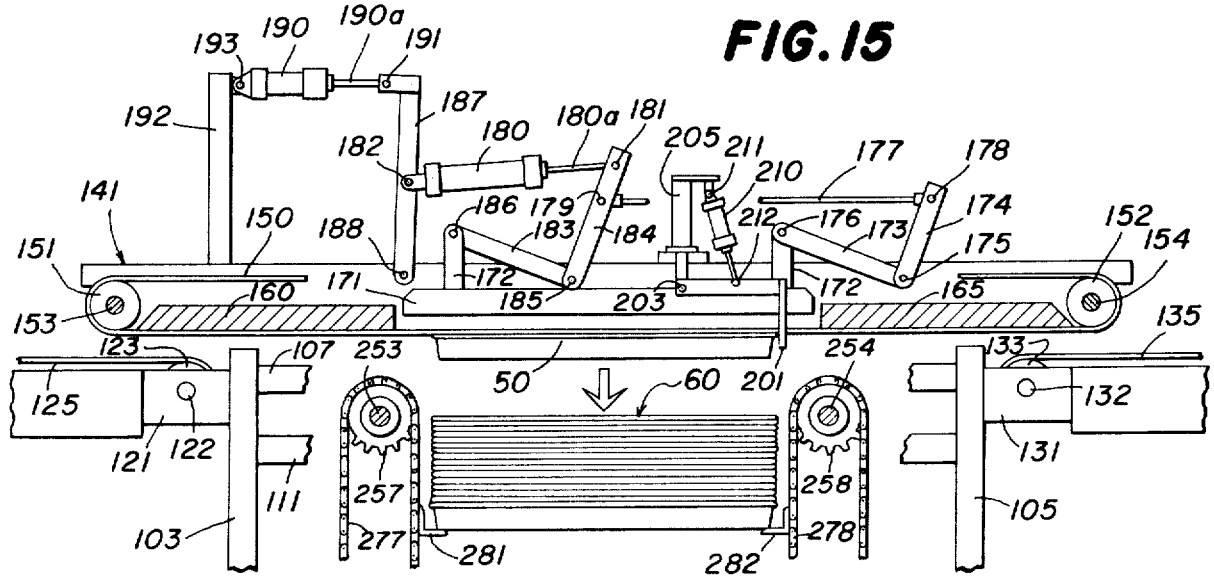
FIG. 15 is a schematic view of the transfer mechanism and elevator of the present invention in the pan stacking mode thereof.
Figure 16:
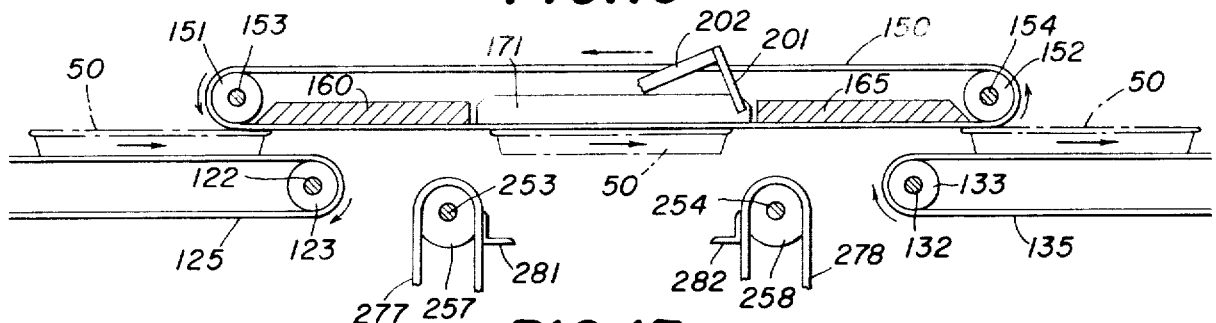
FIGS. 16 to 20 are simplified schematic views of the machine of the present invention in the pass-through mode thereof, the stacking mode thereof, the unstacking mode thereof and the pass-through mode thereof, particularly illustrating a complete operative cycle of the machine.
Figure 17:
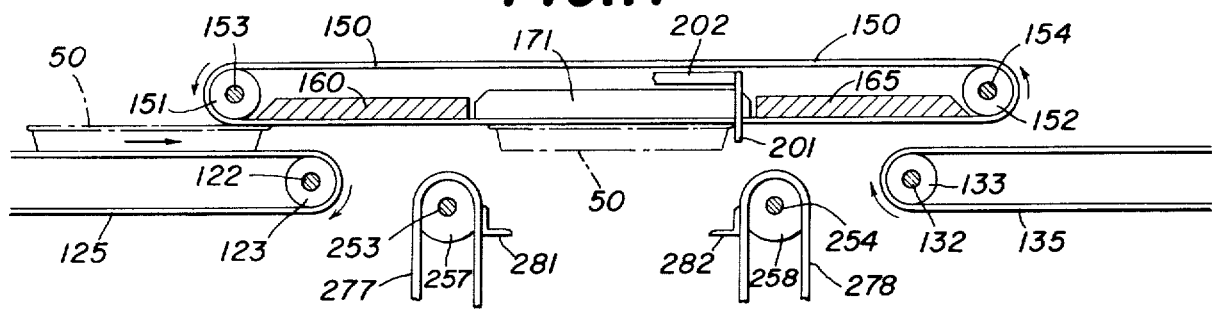
Figure 18:
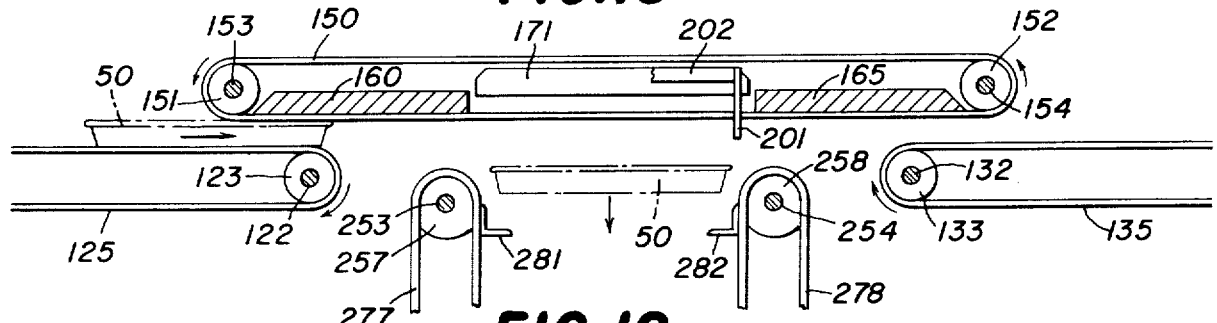
Figure 19:
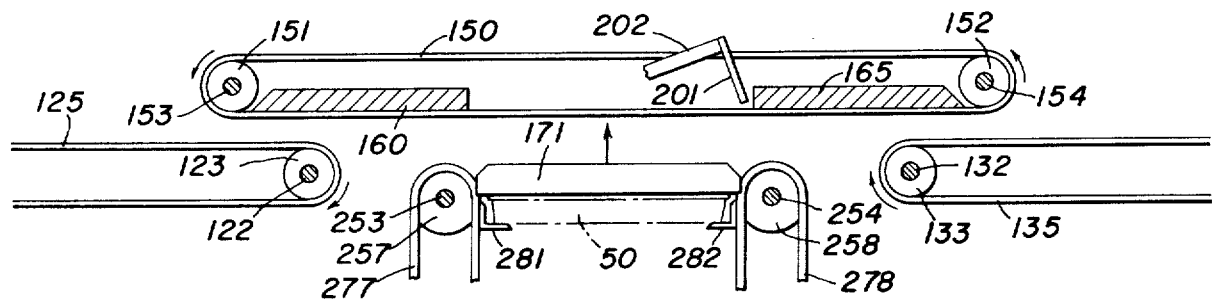
Figure 20:
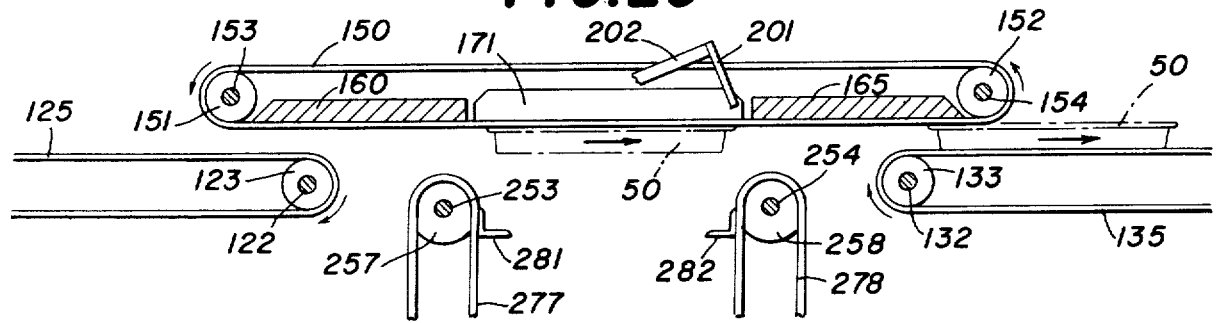

The stacker-unstacker 100 of the present invention is operable in a stacking mode when it is in the condition as shown in FIG. 15 wherein the pan stop 200 is in the stop position thereof to interpose stop members 201 in the path of the pan 50 being conveyed by the transfer conveyor 140. More particularly, the motor 210 is in the extended position thereof wherein the piston 210A is extended thereby to position the stop members 201 as shown. The piston 180A of the motor 180 and the piston 190A of the motor 190 are both extended thereby to provide mechanism for breaking the magnetic coupling between the pan 50 and the shiftable magnet 170, the shiftable magnet being in its uppermost position with respect to the endless belts 150. As hereinafter explained, movement of the shiftable magnet 170 to the position shown in FIG. 15 is effected subsequent to the positioning of the pan 50 in registry with the pan carrier by the pan stop 200. After each pan 50 is dropped into the stack 60 the elevator 250 indexes downwardly so as to be in position to receive the next pan 50, all as hereinafter will be set forth.

It is seen, therefore, that there has been provided a transfer conveyor including mechanism for magnetically coupling a baking pan thereon and transporting the baking pan from an infeed conveyor 120 to an outfeed conveyor 130. The transport conveyor 140 is constructed and arranged to be operable so as to unstack pans 50 from a stack 60 thereof to pass pans thereby and to stack pans into a stack.

The transport conveyor 140 is also constructed and arranged to accommodate pans of varying heights, being desirable for one machine to be able to operate with pans for baking bread loaves, breakfast rolls, and other bakery products wherein pans therefor have various heights or depths. It is preferred that the distance between the lower reaches of the endless belts 150 and the upper reaches of the infeed conveyor 120 and the outfeed conveyor 130 be substantially equal to the height or depth of the pan being handled. Since different bakery products require pans having different heights or depts, it is necessary to provide proper means for adjusting the distance between the lower reaches of the endless belts 150 and the upper reaches of the infeed conveyor 120 and the outfeed conveyor 130. There is provided the motor 220 for adjusting the height of the frame 141 of the transfer conveyor 140, the motor 220 being operatively connected to the shafts 221, 222, 223 and 224 and the flange bearings 225, 226, 227 and 228 respectively positioned thereon. Activation of the motor and thereby the output shaft 221 thereof results in rotation of the threaded shafts hereinbefore mentioned whereby the frame 140 is raised or lowered depending on the direction on which the output shaft 221 rotates. It is seen, therefore, that the conveyor 140 is adjustable to accommodate bread pans and the like having various heights or depths.

The elevator 250 provides incremental movement of the pan carries 281 and 282 upwardly toward the transfer conveyor 140 when the stacker-unstacker 100 is in the unstacking mode thereof and provides incremental movement downwardly away from the transfer conveyor when the stacker-unstacker is in the stacking mode thereof and remains stationary when the stacker-unstacker is in the pass-through mode thereof. Vertical movement of the elevator 250 is provided by the drive motor 290 which as hereinbefore set forth is operatively connected to the drive shafts 305 and 306 which are connected respectively to the gear reducers 301 and 302. The gear reducers and more particularly the output shafts thereof are operatively connected to the shafts 253 and 254 on which are fixedly mounted the sprockets 257 and 258. The pan carriers 281 and 282 are respectively mounted on two spaced apart chains 277 and two spaced apart chains 278, the chains 277 interconnecting the sprockets 257 and 273 and the chains 278 interconnecting the sprockets 258 and 274. It is seen, therefore that operation of the motor 290 will result in movement of the chains 277 and the chains 278 and the pan carriers 281 and 282 respectively carried thereby upwardly toward the transfer conveyor or downwardly and away from the transfer conveyor depending on the direction of the output shaft 291. The incremental movement of the elevator 250 is provided in part by the clutch brake assembly 295, more specifically described hereafter.

The elevator 250 is constructed and arranged to accommodate baking pans and the like having different lengths or widths. To this end, the length adjustment mechanism 340 and the motor 360 therefor have been provided. Operation of the motor 360 results in rotation of the threaded shafts 341 and 342, thereby to move the shafts 253 and 254 toward and away from one another as desired to accommodate baking pans 50 of various widths or lengths, the take-up arms 317 and 318 serving to maintain the proper tension on the chains 315 and 316 interconnecting the gear reducers 301 and 302 with the respective shafts 253 and 254. In it seen, therefore, that there has been provided an elevator 250 having pan carriers 281 and 282 which are movable incrementally toward and away from the transfer conveyor 140 and are adjustable to accommodate baking pans 50 of various lengths and widths.

The pneumatic and electrical circuits along with the control mechanism for the stacker-unstacker 100 and the system thereof will hereinafter be set forth.

Figure 21:
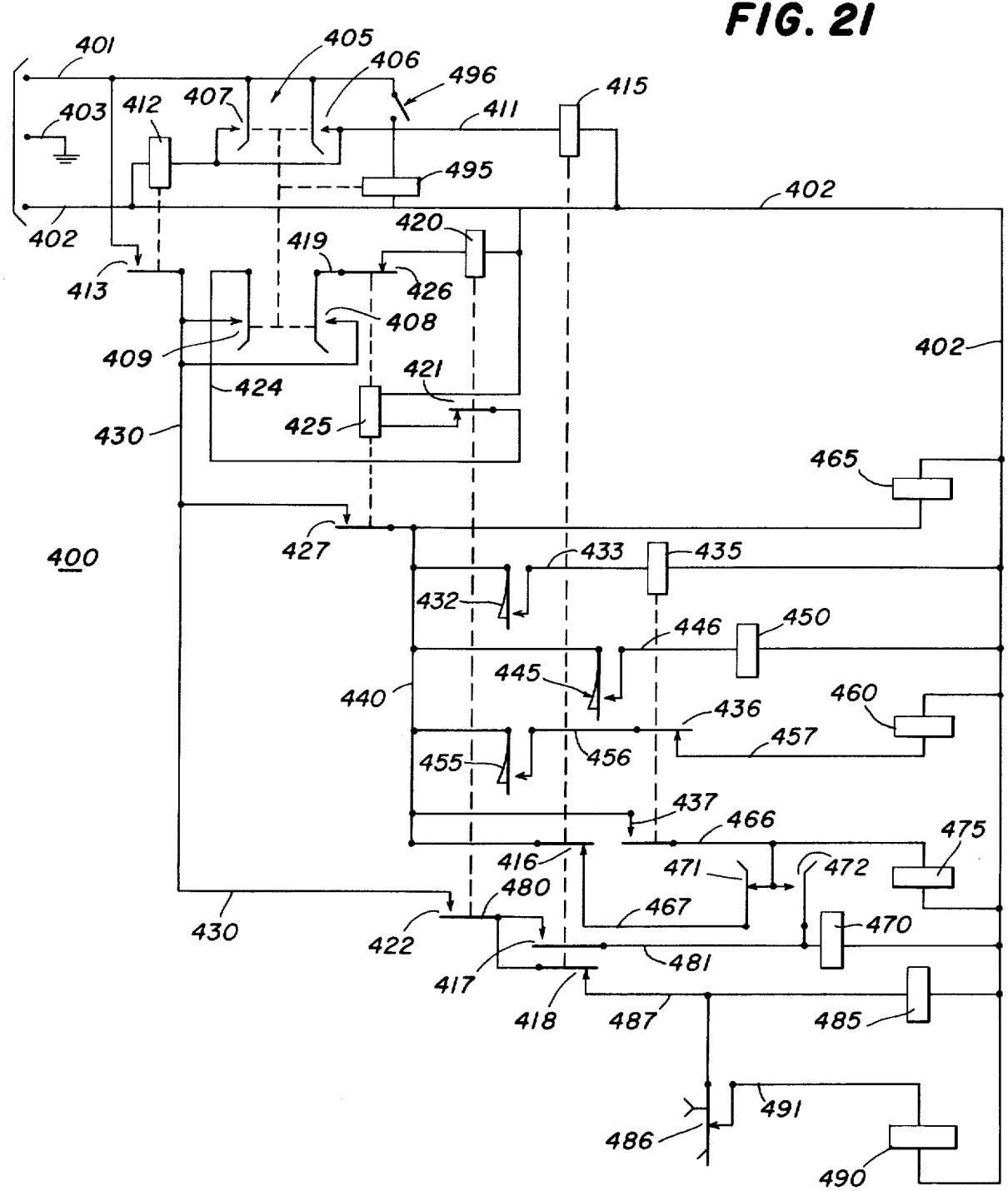
FIG. 21 is a schematic diagram of the electrical control circuit for the system of the present invention.

Referring now to FIG. 21 of the drawings, there is illustrated a control circuit 400 for causing the essentially automatic operation of the baking pan stacker-unstacker 100 of the present invention. The several manual controls included in the control circuit 400 are conveniently located on the frame 101 and the various frame members thereof. The control circuit 400 is operable from a typical commercial electrical source which comprises a three-wire Edison system including main conductors 401 and 402 and a grounded neutral conductor 403.

The control circuit 400 further includes a main switch 405 which is operable between an unstacking mode, a pass-through mode and a stacking mode, all as will hereinafter be set forth.

The main switch 405 is operated between the various modes thereof by a relay 495 operatively connected to the switch 405 and to a micro switch 496 positioned downstream from the stacker-unstacker 100 for sensing the presence of a baking pan 50 at the baking oven (not shown). The relay 495 and switch 496 serve as a demand sensing apparatus. The main switch 405 has four pairs of normally open contacts 406, 407, 408 and 409. One of the normally open contacts 406 is connected to the conductor 401 and the other of the normally open contacts 406 is connected to a conductor 411 which is connected to one terminal of a belt conveyor relay 412, the other terminal of the belt conveyor relay 412 being connected to the conductor 402. The belt conveyor relay 412 is provided with a pair of normally open contacts 413. One of the normally open contacts 407 of the switch 405 is connected to the conductor 401 and the other contact is connected to one terminal of a photo amplifier 415 which has the other terminal thereof connected to an electric eye positioned on the elevator 250 in the same manner as the electric eye disclosed in U.S. Pat. No. 3,533,517, issued Oct. 13, 1970 to Henry A. Heide for AUTOMATIC PAN STACKER, the disclosure of which is incorporated herein by reference. The photo amplifier 415 has a pair of normally closed contacts 416, a pair of normally open contacts 417 and a second pair of normally closed contacts 418.

One of the normally open contacts 408 of the switch 405 is connected to one of the normally open contacts 413 of the belt conveyor relay 412, the other of the normally open contacts 413 being connected to the conductor 401. The other of the normally open contacts 408 is connected by a conductor 419 to one of a pair of normally closed contacts 426 associated with a stacking relay 425, the stacking relay 425 having a pair of normally open contacts 427. An unstacking relay 420 has one terminal thereof connected to the other of the normally closed contacts 426 and has the other terminal thereof connected to the conductor 402. The stacking relay 425 has one terminal thereof connected to the conductor 402 and has the other terminal thereof connected to one of the normally closed contacts 421 of the unstacking relay 420. The other contact of the normally closed contacts 421 is connected by a conductor 424 to one of the normally open contacts 409 of the switch 405. The other one of the normally open contacts 409 is connected to a conductor 430 which is also connected to the connected ones of the normally open contacts 408 and 413.

Figure 12:
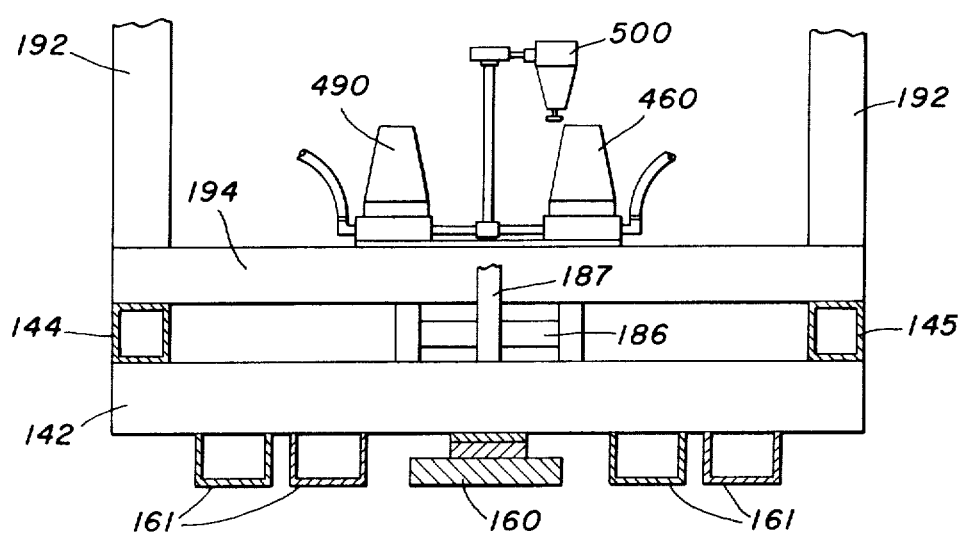
FIG. 12 is a view in vertical section of the machine shown in FIG. 9 as viewed along lines 12—12 thereof.

As seen, one of the normally open contacts 427 of the stacking relay 425 is connected to the conductor 430, the other of the contacts 426 being connected to one terminal of a stack discharge limit switch 432 located at the bottom of the elevator 250 near the conveyor 335. The other terminal of the stack discharge limit switch 432 is connected by conductor 433 to one coil 435 of a mechanical latching relay which is also connected to the conductor 402. The mechanical latching coil 435 has a pair of normally closed contacts 436 and a pair of normally open contacts 437. A conductor 440 is connected to the connected ones of the contacts 427 and the terminal of the stack discharge limit switch 432. The conductor 440 is also connected to one terminal of a normally open carrier stop limit switch 445 located near the top of the elevator 250 to limit the height of the stack 60 of baking pans. The other terminal of the carrier stop limit switch 445 is connected by conductor 446 to the other coil 450 of the mechanical latching relay. The conductor 440 is further connected to one terminal of a pan stop limit switch 455 located on the pan stop 200 in position to be connected by a pan 50, the other terminal of the limit switch 455 being connected by conductor 456 to one of the normally closed contacts 436 of the mechanical latching relay coil 435. The other one of the normally closed contacts 436 is connected by conductor 457 to one terminal of a magnet assembly solenoid 460, see FIG. 12, the other terminal of which is connected to the conductor 402. A pan stop solenoid 465 has its terminals connected between the conductor 440 and the conductor 402 while the normally open contacts 437 of the relay 435 are connected between the conductor 440 and a conductor 466.

Finally, one of the normally closed contacts 416 of the photo amplifier 415 is connected to the conductor 440 and the other one is connected by conductor 467 to one terminal of a normally closed switch 471 of a time delay relay 470, the switch 471 having the other terminal thereof connected to the conductor 466. The time delay relay 470 also has a normally open switch 472 which is ganged to the normally closed switch 471. A clutch brake solenoid 475 is connected to the clutch brake 295 and the three phase drive motor 290 for the elevator 250. The solenoid 475 has one terminal thereof connected to the conductor 466 and the other terminal thereof connected to the conductor 402. As seen from FIG. 21, one of the normally open contacts 422 of the unstacking relay 420 is connected to the conductor 430 while the other of the normally open contacts thereof is connected to a conductor 480 and one of the normally open contacts 417 of the photo amplifier 415. The other one of the normally open contacts 417 is connected by a conductor 481 to one terminal of the time delay 470 and to one terminal of the normally open switch 472 thereof.

A second time delay relay 485 has one terminal thereof connected to the conductor 402 and the other terminal thereof connected by a conductor 487 to one terminal of the normally closed switch 486 and to one terminal of the normally closed contacts 418. The terminal of the normally closed switch 486 connected to the relay 485 is also connected to one of the normally closed contacts 418 of the photo amplifier 415, the other one of the normally closed contacts 418 being connected to the conductor 480. The terminal of the normally closed switch 486 not connected to the time delay 485 is connected by a conductor 491 to one terminal of a magnet assembly solenoid 490, see FIG. 12; the other terminal of which is connected to the conductor 402.

An operational cycle of the stacker-unstacker 100 will now be set forth. For instance, in the morning when the stacker-unstacker 100 is started, there are no pans 50 either downstream of the stacker-unstacker or upstream of the stacker-unstacker while there is a stack 60 of bread pans 50 in the stacker-unstacker 100, more particularly in the elevator 250. Once the control circuit 400 is energized in the usual manner, the relay 495 and particularly the micro switch 496 located downstream of the stacker-unstacker 100 senses the need of a bread pan 50, the relay 495 sensing the signal from the micro switch 496 that no pans are present downstream and the signal from a second micro switch (not shown) located upstream of the stacker-unstacker 100 that no bread pans are available upstream operates the switch 405 to the unstacking mode thereof.

The switch 405 in the unstacking mode thereof closes the normally open contacts 406, 407 and 408. The relay 412 is energized thereby also energizing the drive motor 155 for the transfer conveyor 140 while closing the normally open contacts 413 of the relay 412. The relay 420 is energized thereby engaging the contacts of the three phase motor 290 while the normally closed contacts 421 are open and the normally open contacts 422 are closed.

Simultaneously the photo amplifier 415 is energized thereby to establish the light beam and open the normally closed contacts 416 and close the normally open contacts 417 and open the normally closed contacts 418. The relay 470 is energized and after a two second time delay the normally open switch 472 closes thereby energizing the solenoid 475. At this time, the mechanical constituents of the machine are in the position shown in FIG. 14 of the drawings; however, upon energization of the solenoid 475 the clutch brake assembly 295 is operated so as to disengage the brake and engage the clutch to permit the motor 290 to drive the elevator and more particularly the pan carriers 281 carrying the stack 60 of bread pans 50 upward until the topmost pan breaks the light beam.

When the light beam is broken, the normally closed contacts 416 close and the normally open contacts 417 open and the normally closed contacts 418 close, thereby deenergizing the solenoid 475 to operate the clutch-break assembly 295 to apply the brake and disengage the clutch thereby to disengage the motor 290 and halt the upward movement of the pan carriers 281 and the stack of baking pans 60 thereon. Simultaneously, relay 490 is energized thereby to withdraw piston 180a of the motor 180 to lower the shiftable magnet 170 to engage the topmost pan 50 of the stack 60, as shown in FIG. 13. Simultaneously, with the energization of the relay 490 the time delay relay 485 is also energized and after a time interval of less than one second or about three-quarter of a second the normally closed switch 486 opens thereby deenergizing the solenoid 490 which results in air from the air controller 500, see FIG. 12, being pumped into the motor 180 to expand the piston 180a so as to raise the shiftable magnet 170 to the position shown in FIG. 14, resulting in the transfer of the baking pan 50 by the conveyor belts 150 to the outfeed conveyor 130. As the baking pan is raised from the stack 50 to a position to be in contact with the transfer conveyor belts 150, the light beam is reestablished thereby opening the normally closed contacts 416 and closing the normally open contacts 417 and opening the normally closed contacts 418. The stacker-unstacker 100 is now in condition to repeat the cycle wherein the elevator 250 operates to raise the stack 60 of baking pans and the shiftable magnet 170 moves downwardly to engage the topmost pan on the stack 60 and raise it into contact with the transfer conveyor belts 150 which convey the pan 50 to the outfeed conveyor 135.

After a sufficient number of baking pans 50 have been unstacked, as hereinbefore set forth, and the pans have been used and returned, there will be a sufficient number of pans in the line so that further unstacking is not needed. In this situation, when the relay 495 senses the need from the micro switch 496 for a baking pan 50, the micro switch (not shown) downstream of the stacker-unstacker 100 will sense the presence of a baking pan thereat and the relay 495 automatically will operate to position the switch 405 in the pass-thru mode thereof. In the pass-thru mode of the switch 405, the normally open contacts 406 and 407 are closed thereby energizing the relay 412 and the transfer conveyor motor 155. Also, the photo amplifier 415 is energizing thereby to establish the light beam and the normally open contacts 413 are closed. In this condition, the transfer conveyor belts 150 continually move to transfer baking pans 50 from the infeed conveyor 120 to the outfeed conveyor 130. As long as a bread pan 50 is located upstream of the stacker-unstacker 100 when the need for a bread pan 50 exists downstream of the stacker-unstacker, the switch 405 will be operated in the pass-through mode thereof. When a bread pan 50 is needed downstream of the stacker-unstacker 100, and no bread pan is available upstream of the stacker-unstacker, then the swtich 405 will be in the unstacking mode thereof, as hereinbefore set forth. When no need exists for a bread pan 50 downstream of the stacker-unstacker 100 and a bread pan is available upstream of the stacker-unstacker, then the switch 405 will be operated in the stacking mode thereof.

In the stacking mode, the normally open contacts 406, 407 and 409 are closed, both the transfer conveyor motor 155 and the photo amplifier 415 are energized and operating. With the photo amplifier 415 energized and the light beam established, the normally closed contacts 416 open and the normally open contacts 417 close and the normally closed contacts 418 open. The relay 425 is energized and engages the down contacts of the three phase motor 290 and simultaneously the normally closed contacts 426 open and the normally open contacts 427 close. The pan carriers 281 which have passed over the sprockets 257 and 258 have tripped the limit switch 445 thereby to position a mechanical latch relay having coils 435 and 450 with the contacts 436 closed and the contacts 437 open. Although the limit switch 445 is only momentarily closed by the pan carrier 281 passing thereby, the mechanical latch holds the relays 436 and 437 in the positions just described.

Since the normally open contacts 427 are closed, the solenoid 465 is energized thereby to operate the motor 210 and to lower the pan stop 200 so that the stop members 201 are in position to intercept a pan 50 transported by the transfer conveyor 140. The pan stop 200 and more particularly the stop members 201 carry a limit switch 455 thereon which is contacted by a pan 50 as shown in FIG. 15. When the limit switch 455 is closed, the solenoid 460 is energized thereby operating the motor 190 so as to expand the piston 190a thereof which moves the shiftable magnet 170 to the position shown in FIG. 15, thereby breaking the magnetic connection between the transfer conveyor 140 and the pan 50 to permit the pan 50 to drop from the transfer conveyor onto pan carriers 281 and 282 to begin the formation of the stack 60. After the pan 50 closes the limit switch 455 to energize the solenoid 460 and the pan drops, the limit switch 455 opens thereby to deenergize the solenoid 460 and to lower the magnet 170 into position to receive another pan 50. When the pan 50 drops the light beam is broken thereby closing the normally closed contacts 416 and opening the normally open contacts 417 and closing the normally closed contacts 418. When the contacts 416 close, the solenoid 475 is energized to operate the clutch-brake assembly 295 to release the brake and engage the clutch thereby to permit the motor 290 to drive the elevator 250 downwardly until the light beam is reestablished to open the normally closed contacts 416 which deenergizes the solenoid 475, thereby to disengage the clutch and engage the brake. At this point the cycle is repeated until the stack 60 is sufficiently full so as to trip the limit switch 432 which activates the mechanical latch relay having the coils 435 and 450 to open the normally closed contacts 436 and to close the normally open contacts 437. When the contacts 437 close, the solenoid 437 is energized thereby permitting the motor 290 to drive the elevator downwardly until the stack 60 rests upon the conveyor 335 which moves the stack 60 of bread pans out of the elevator 250, the elevator running until the pan carriers 283 and 284 trip the limit switch 445 to recycle the mechanical latch relay in position with the contacts 436 closed and the contacts 437 open, whereby the stacker-unstacker 100 is in position again to stack bread pans 50. Subsequent to the time that the limit switch 432 is tripped, no bread pan 50 can be dropped because the normally closed contacts 436 are open thereby preventing solenoid 460 from being energized to raise the shiftable magnet 170 and, therefore any bread pan 50 in position to be dropped will remain held by the shiftable magnet 170 until the limit switch 445 is again tripped to close the contacts 436 which allows magnet 170 to be moved upwardly.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A machine for both feeding into a stack and removing from a stack baking pans and the like, said machine comprising a transfer conveyor for conveying baking pans to the stack, away from the stack and past the stack, said transfer conveyor including attraction means for attracting the baking pans and holding them in engagement with said transfer conveyor during transfer of the baking pans thereby, a pan carrier mounted below said transfer conveyor in position to receive a pan dropped therefrom, said attraction means including a pan positioning mechanism for sequentially separating baking pans from said transfer conveyor and sequentially depositing the baking pans upon said pan carrier to form a stack of pans thereon and for sequentially lifting baking pans from said pan carrier and sequentially engaging the baking pans with said transfer conveyor, said pan positioning mechanism being movable above and away from said transfer conveyor for separating baking pans therefrom and being movable below said transfer conveyor for lifting baking pans from said pan carrier, carrier drive mechanism for moving said pan carrier upwardly and toward said transfer conveyor as pans are unstacked from said pan carrier and onto said transfer conveyor and for moving said pan carrier downwardly and away from said transfer conveyor as baking pans are stacked on the said pan carrier from said transfer conveyor, and a control mechanism for selectively and sequentially operating said transfer conveyor and said pan positioning mechanism and said carrier drive mechanism in a baking pan unstacking mode and in a baking pan pass-through mode and in a baking pan stacking mode, said control mechanism in the baking pan unstacking mode thereof causing said pan positioning mechanism to operate sequentially to move below said conveyor to lift baking pans from said pan carrier and sequentially engage the baking pans and said transfer conveyor as said carrier drive mechanism sequentially moves said pan carrier upwardly and toward said transfer conveyor, said control mechanism in the pass-through mode thereof causing said transfer conveyor to carry the baking pans past said pan carrier, said control mechanism in the stacking mode thereof causing said pan positioning mechanism to operate sequentially to move above and away from said conveyor to separate baking pans from said transfer conveyor by breaking the attraction therebetween and sequentially deposit the baking pans upon said pan carrier as said pan carrier drive mechanism sequentially moves said pan carrier downwardly and away from said transfer conveyor.

2. The machine set forth in claim 1, wherein said transfer conveyor includes spaced apart and parallel endless belts.

3. The machine set forth in claim 1 and further comprising, means for adjusting the distance between said transfer conveyor and said pan carrier, thereby to accommodate different sized pans.

4. The machine set forth in claim 1, wherein said pan carrier is constructed and arranged to carry pans of different widths and lengths, thereby to accommodate stacking and unstacking of pans having different widths and lengths.

5. The machine set forth in claim 1, wherein said pan positioning mechanism includes means for positioning the pan in registry with said pan carrier prior to separation of the baking pan from said transfer conveyor.

6. A machine for both feeding into a stack and removing from a stack baking pans and the like, said machine comprising an infeed conveyor for conveying baking pans, a transfer conveyor including attraction means for attaching and lifting a baking pan from said infeed conveyor and holding it in engagement with said transfer conveyor, a pan carrier mounted below said transfer conveyor in position to receive a pan dropped therefrom, said attraction means including a pan positioning mechanism for sequentially separating baking pans from said transfer conveyor and sequentially depositing the baking pans upon said pan carrier to form a stack of pans thereon and for sequentially lifting baking pans from said pan carrier and sequentially engaging the baking pans with said transfer conveyor, an outfeed conveyor for conveying baking pans away from said transfer conveyor, said pan positioning mechanism being movable above and away from said transfer conveyor for separating baking pans therefrom and being movable below said transfer conveyor for lifting baking pans from said pan carrier, carrier drive mechanism for moving said pan carrier upwardly and toward said transfer conveyor as pans are unstacked from said pan carrier and onto said transfer conveyor and for moving said pan carrier downwardly and away from said transfer conveyor as baking pans are stacked on the said pan carrier from said transfer conveyor, and a control mechanism for selectively and sequentially operating said conveyors and said pan positioning mechanism and said carrier drive mechanism in a baking pan unstacking mode and in a baking pan pass-through mode and in a baking pan stacking mode, said control mechanism in the baking pan unstacking mode thereof causing said pan positioning mechanism to operate sequentially to move below said transfer conveyor to lift baking pans from said pan carrier and sequentially engage the baking pans and said transfer conveyor as said carrier drive mechanism sequentially moves said pan carrier upwardly and toward said transfer conveyor, said control mechanism in the pass-through mode thereof causing said transfer conveyor to carry the baking pans from said infeed conveyor to said outfeed conveyor, said control mechanism in the stacking mode thereof causing said pan positioning mechanism to operate sequentially to move above and away from said transfer conveyor to separate baking pans from said transfer conveyor by breaking the attraction therebetween and sequentially deposit the baking pans upon said pan carrier as said pan carrier drive mechanism sequentially moves said pan carrier downwardly and away from said transfer conveyor.

7. The machine set forth in claim 6, wherein said transfer conveyor includes an endless belt having an upper reach and a lower reach, said infeed conveyor and said outfeed conveyor each include an endless belt having an upper reach and a lower reach, the lower reach of said transfer conveyor being positioned above the upper reaches of said infeed conveyor and said outfeed conveyor to provide transfer of baking pans and the like from the upper reach of said infeed conveyor to the lower reach of said transfer conveyor to the upper reach of said outfeed conveyor.

8. A machine for both feeding into a stack and removing from a stack baking pans and the like including a magnetizable portion, said machine comprising a transfer conveyor including magnetic means for holding a baking pan for transport by said conveyor to the stack, away from the stack and past the stack, a pan carrier mounted below said transfer conveyor in position to receive a pan dropped therefrom, said magnetic means including a magnetic pan positioning mechanism for sequentially separating baking pans from said pan carrier to form a stack of pans thereon and for sequentially lifting baking pans from said pan carrier and sequentially engaging the baking pans with said magnetic means of said transfer conveyor, said pan positioning mechanism being movable above and away from said transfer conveyor for separating baking pans therefrom and being movable below said transfer conveyor for lifting baking pans from said pan carrier, carrier drive mechanism for moving said pan carrier upwardly and toward said transfer conveyor as pans are unstacked from said pan carrier and onto said transfer conveyor and for moving said pan carrier downwardly and away from said transfer conveyor as baking pans are stacked on the said pan carrier from said transfer conveyor, and a control mechanism for selectively and sequentially operating said transfer conveyor and said pan positioning mechanism and said carrier drive mechanism in a baking pan unstacking mode and in a baking pan pass-through mode and in a baking pan stacking mode, said control mechanism in the baking pan unstacking mode thereof causing said magnetic pan positioning mechanism to operate sequentially to move below said conveyor and magnetically to lift baking pans from said pan carrier and sequentially engage the baking pans with the magnetic means associated with said transfer conveyor as said carrier drive mechanism sequentially moves said pan carrier upwardly and toward said transfer conveyor, said control mechanism in the pass-through mode thereof causing said transfer conveyor to carry the baking pans past said pan carrier, said control mechanism in the stacking mode thereof causing said pan positioning mechanism to operate sequentially to move above and away from said conveyor to separate baking pans from said transfer conveyor by breaking the magnetic coupling therebetween and sequentially to deposit the baking pans upon said pan carrier as said pan carrier drive mechanism sequentially moves said pan carrier downwardly and away from said transfer conveyor.

9. The machine set forth in claim 8, wherein said transfer conveyor includes an endless belt having an upper reach and a lower reach and further includes magnets positioned above the lower reach of said endless belt for holding baking pans onto the lower reach of said endless belt for transfer of baking pans thereby.

10. The machine set forth in claim 8, wherein said transfer conveyor includes an endless belt having an upper reach and a lower reach, said magnetic pan positioning mechanism includes a vertically movable magnet, said vertically movable magnet being movable between a first position above and adjacent to the lower reach of said endless belt and a second position below the lower reach of said endless belt and adjacent to said pan carrier.

11. A machine for both feeding into a stack and removing from a stack baking pans and the like including a magnetizable portion, said machine comprising an infeed conveyor for conveying baking pans, a transfer conveyor including magnetic means for lifting a baking pan from said infeed conveyor and holding the baking pan for transport by said transfer conveyor, a pan carrier mounted below said transfer conveyor in position to receive a pan dropped therefrom, said magnetic means including a magnetic pan positioning mechanism for sequentially separating baking pans from said transfer conveyor and sequentially depositing the baking pans upon said pan carrier to form a stack of pans thereon and for sequentially lifting baking pans from said pan carrier and sequentially engaging the baking pans with said magnetic means of said transfer conveyor, an outfeed conveyor for conveying baking pans away from said transfer conveyor, said pan positioning mechanism being movable above and away from said transfer conveyor for separating baking pans therefrom and being movable below said transfer conveyor for lifting baking pans from said pan carrier, carrier drive mechanism for moving said pan carrier upwardly and toward said transfer conveyor as pans are unstacked from said pan carrier and onto said transfer conveyor and for moving said pan carrier downwardly and away from said transfer conveyor as baking pans are stacked on the said pan carrier from said transfer conveyor, and a control mechanism for selectively and sequentially operating said conveyors and said pan positioning mechanism and said carrier drive mechanism in a baking pan unstacking mode and in a baking pan pass-through mode and in a baking pan stacking mode, said control mechanism in the baking pan unstacking mode thereof causing said magnetic pan positioning mechanism to operate sequentially to move below said transfer conveyor and magnetically to lift baking pans from said pan carrier and sequentially engage the baking pans with the magnetic means associated with said transfer conveyor as said carrier drive mechanism sequentially moves said pan carrier upwardly and toward said transfer conveyor, said control mechanism in the pass-through mode thereof causing said transfer conveyor to carry the baking pans from said infeed conveyor to said outfeed conveyor, said control mechanism in the stacking mode thereof causing said pan positioning mechanism to operate sequentially to move above and away from said transfer conveyor to separate baking pans from said transfer conveyor by breaking the magnetic coupling therebetween and sequentially to deposit the baking pans upon said pan carrier as said pan carrier drive mechanism sequentially moves said pan carrier downwardly and away from said transfer conveyor.

12. The machine set forth in claim 11, wherein said transfer conveyor includes an endless belt having an upper reach and a lower reach, said infeed conveyor and said outfeed conveyor each includes an endless belt having an upper reach and a lower reach, the lower reach of said transfer conveyor being positioned above the upper reaches of said infeed conveyor and said outfeed conveyor to provide transfer of baking pans and the like from the upper reach of said infeed conveyor to the lower reach of said transfer conveyor to the upper reach of said outfeed conveyor.

13. A machine for both feeding into a stack and removing from a stack baking pans and the like including a magnetizable portion, said machine comprising a conveyor including magnetic means for magnetically coupling to a baking pan to hold the baking pan on said conveyor for transport thereby, a pan carrier mounted adjacent to said conveyor in position to receive a pan dropped therefrom, said magnetic means including a shiftable magnet mounted adjacent to said conveyor and movable toward and away from said pan carrier, magnet drive mechanism for moving said shiftable magnet among a first position adjacent to said pan carrier and a second position adjacent to said conveyor and a third position away from said conveyor on the side opposite said pan carrier, said shiftable magnet in the first position thereof magnetically coupling to a baking pan upon said pan carrier and in the second position thereof placing the baking pan on said conveyor in position for coupling to said magnetic means of said conveyor, carrier drive mechanism for moving said pan carrier upwardly and toward said conveyor as pans are unstacked from said pan carrier and for moving said pan carrier downwardly and away from said conveyor as baking pans are stacked on said pan carrier, and control mechanism for selectively operating said conveyor and said shiftable magnet drive mechanism and said carrier drive mechanism in a baking pan unstacking mode and in a baking pan pass-through mode and in a baking pan stacking mode, said control mechanism in the baking pan unstacking mode thereof causing said magnet drive mechanism to shift said shiftable magnet between the first and second positions thereof sequentially to engage baking pans on said pan carrier and to lift the baking pan from said pan carrier onto said conveyor for coupling to the magnetic means of said conveyor, said control mechanism in the pass-through mode thereof causing said magnet drive mechanism to hold said shiftable magnet in the second position thereof so that said conveyor carrier baking pans therealong and past said pan carrier, said control mechanism in the stacking mode thereof causing said magnet drive mechanism to shift said shiftable magnet between the second and third positions thereof sequentially to break the magnetic coupling between the baking pans and said conveyor to drop baking pans from said conveyor upon said pan carrier after which said pan carrier drive mechanism moves said pan carrier downwardly and away from said carrier.

14. The machine set forth in claim 13, wherein said magnetic means for magnetically coupling a baking pan to said conveyor includes spaced apart permanent magnets positioned adjacent to said conveyor with said shiftable magnet being mounted intermediate said spaced apart permanent magnets.

15. The machine set forth in claim 13, wherein said magnet drive mechanism includes an air motor.

16. A machine for both feeding into a stack and removing from a stack baking pans and the like including a magnetizable portion, said machine comprising a conveyor including magnetic means for magnetically coupling to a baking pan to hold the baking pan on said conveyor for transport thereby, a pan carrier mounted adjacent to said conveyor in position to receive a pan dropped therefrom, a stop member mounted adjacent to said conveyor and movable between a retracted position and a stop position, stop member drive mechanism for moving said stop member between said retracted position wherein the stop member is out of the path of baking pans on said conveyor and said stop position wherein said stop member stops baking pans in registry with said pan carrier, said magnetic means including a shiftable magnet mounted adjacent to said conveyor and movable toward and away from said pan carrier, magnet drive mechanism for moving said shiftable magnet among a first position adjacent to said pan carrier and a second position adjacent to said conveyor and a third position away from said conveyor on the side opposite said pan carrier, said shiftable magnet in the first position thereof magnetically coupling to a baking pan upon said pan carrier and in the second position thereof placing the baking pan on said conveyor in position for coupling to said magnetic means of said conveyor, carrier drive mechanism for moving said pan carrier upwardly and toward said conveyor as pans are unstacked from said pan carrier and for moving said pan carrier downwardly and away from said conveyor as baking pans are stacked on said pan carrier, and control mechanism for selectively operating said conveyor and said stop member drive mechanism and said shiftable magnet drive mechanism and said carrier drive mechanism in a baking pan unstacking mode and in a baking pan pass-through mode and in a baking pan stacking mode, said control mechanism in the baking pan unstacking mode thereof causing said stop member drive mechanism to hold said stop member in the retracted position thereof and causing said magnet drive mechanism to shift said shiftable magnet between the first and second positions thereof sequentially to engage baking pans on said pan carrier and to lift the baking pans from said pan carrier onto said conveyor for coupling to the magnetic means of said conveyor, said control mechanism in the pass-through mode thereof causing said stop member drive mechanism to hold said stop member in the retracted position thereof and causing said magnet drive mechanism to hold said shiftable magnet in the second position thereof so that said conveyor carries baking pans therealong and past said pan carrier, said control mechanism in the stacking mode thereof causing said stop member drive mechanism to move said stop member into the path of a baking pan on said conveyor and causing said magnet drive mechanism to shift said shiftable magnet between the second and third positions thereof sequentially to break the magnetic coupling between the baking pans and said conveyor to drop baking pans from said conveyor upon said pan carrier after which said pan carrier drive mechanism moves said pan carrier downwardly and away from said conveyor.

17. The machine set forth in claim 16, wherein said stop mechanism includes spaced apart arms.

18. The machine set forth in claim 16, wherein stop member drive mechanism includes an air motor.

19. The machine set forth in claim 16, wherein said transfer conveyor includes spaced apart and parallel endless belts and said stop member is positioned therebetween for movement of said stop member between the first and the second positions thereof.

20. A machine for both feeding into a stack and removing from a stack baking pans and the like including a magnetizable portion, said machine comprising a conveyor having a lower reach and including magnetic means for magnetically coupling to a baking pan to hold the baking pan beneath the lower reach of the conveyor for transport thereby, said magnetic means including two stationary portions spaced apart a distance at least equal to about the dimension of a baking pan in the direction of travel of said conveyor and a shiftable magnet disposed in the gap between the stationary portions, magnet drive mechanism for moving said shiftable magnet between a central position disposed adjacent to said lower reach and an up position disposed well above said lower reach and a down position disposed well below said lower reach, said shiftable magnet in the central position thereof cooperating with said stationary magnet portions to convey a baking pan upon said conveyor from one of the stationary portions across said shiftable magnet and on to the other stationary portion and in the up position thereof being spaced from a baking pan on said lower reach a distance such as to break the magnetic coupling therewith, a pan carrier mounted below said lower reach and in vertical registry with said shiftable magnet to receive a pan dropped from said conveyor, a stop member mounted adjacent to said conveyor and movable between a retracted position out of the path of a baking pan on said lower reach and a stop position in the path of a baking pan on said lower reach, stop member drive mechanism for moving said stop member between said retracted position and said stop position wherein said stop member stops baking pans in registry with said pan carrier, carrier drive mechanism for moving said pan carrier upwardly and toward said conveyor as pans are unstacked from said pan carrier and for moving said pan carrier downwardly and away from said conveyor as baking pans are stacked on said pan carrier, and control mechanism for selectively operating said conveyor and said magnet drive mechanism and said stop member drive mechanism and said carrier drive mechanism in a baking pan unstacking mode and in a baking pan pass-through mode and in a baking pan stacking mode, said control mechanism in the baking pan unstacking mode thereof causing said stop member drive mechanism to hold said stop member in the retracted position thereof and causing said magnet drive mechanism to shift said permanent magnet between the down position thereof and the central position thereof sequentially to engage baking pans on said pan carrier and to lift the baking pans from said pan carrier onto said conveyor and into conveying relationship therewith, said control mechanism in the pass-through mode thereof causing said stop member drive mechanism to hold said stop member in the retracted position thereof and causing said magnet drive mechanism to hold said shiftable magnet in the central position thereof so that the conveyor carrier baking pans therealong and past said pan carrier, said control mechanism in the stacking mode thereof causing said stop member drive mechanism to move said stop member into the stop position thereof and sequentially to operate said magnet drive mechanism to shift said magnet from the central position thereof to the up position thereof when a baking pan strikes said stop member to drop the baking pan from said conveyor upon said pan carrier after which said pan carrier drive mechanism moves said pan carrier downwardly and away from said conveyor.

* * * * *